(12) United States Patent
Springett et al.

(10) Patent No.: US 8,496,423 B2
(45) Date of Patent: Jul. 30, 2013

(54) WINDMILL CONVEYANCE SYSTEM AND METHOD FOR USING SAME

(75) Inventors: Frank Benjamin Springett, Spring, TX (US); Dean Allen Bennett, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 553 days.

(21) Appl. No.: 12/731,318

(22) Filed: Mar. 25, 2010

(65) Prior Publication Data

US 2011/0058918 A1    Mar. 10, 2011

Related U.S. Application Data

(60) Provisional application No. 61/241,295, filed on Sep. 10, 2009, provisional application No. 61/256,498, filed on Oct. 30, 2009.

(51) Int. Cl.
*E02B 17/00* (2006.01)
*E03D 1/00* (2006.01)
*F03D 11/04* (2006.01)

(52) U.S. Cl.
USPC ............... 414/10; 52/745.04; 416/142

(58) Field of Classification Search
USPC ......... 405/169, 196, 203, 204, 209; 52/123.1, 52/745.18
See application file for complete search history.

(56) References Cited

U.S. PATENT DOCUMENTS

| 4,311,434 A | | 1/1982 | Abe |
| 4,604,961 A | * | 8/1986 | Ortloff et al. ............ 114/230.12 |
| 5,407,302 A | * | 4/1995 | Springett et al. .............. 405/196 |

(Continued)

FOREIGN PATENT DOCUMENTS

| EP | 1956234 | | 8/2008 |
| FR | 2849877 A1 | * | 7/2004 |

(Continued)

OTHER PUBLICATIONS

International Search Report for PCT Application No. PCT/US2010/028788 dated Mar. 17, 2011.

(Continued)

*Primary Examiner* — Gregory Adams
(74) *Attorney, Agent, or Firm* — The JL Salazar Law Firm

(57) ABSTRACT

A conveyance system and method for delivering at least one component of a windmill to a location is provided. The system is provided with a transporter and a transfer system. The transporter is positionable adjacent a base at the location. The transfer system is provided with a plurality of rails, a support and at least one slider. The rails are positionable on the base and the transporter. The support has a first portion of the rails of the transporter thereon. The support is positionable along a second portion of the rails on a surface of the transporter, and slidably movable between a retracted and an extended position whereby the support is selectively positionable adjacent the base. The slider carries the component(s) of the windmill. The slider is slidably movable along the rails of the transporter and the base whereby the component(s) is/are slidably transferrable between the transporter and the base.

31 Claims, 41 Drawing Sheets

U.S. PATENT DOCUMENTS

| | | |
|---|---|---|
| 6,357,549 B1 | 3/2002 | Brennan et al. |
| 6,614,125 B2 * | 9/2003 | Willis et al. .................... 290/55 |
| 7,112,010 B1 | 9/2006 | Geiger |
| 7,234,409 B2 | 6/2007 | Hansen |
| 7,456,515 B2 | 11/2008 | Nielsen |
| 7,739,843 B2 | 6/2010 | Cortina-Cordero |
| 2002/0171247 A1 | 11/2002 | Willis et al. |
| 2004/0262926 A1 | 12/2004 | Hansen |
| 2009/0087311 A1 | 4/2009 | Wyborn |
| 2010/0139181 A1 | 6/2010 | Cortina-Cordero et al. |

FOREIGN PATENT DOCUMENTS

| | | |
|---|---|---|
| JP | 2004084322 | 3/2004 |
| WO | 03093584 | 11/2003 |
| WO | 2009056969 | 5/2009 |

OTHER PUBLICATIONS

International Preliminary Report on Patentability for PCT Application No. PCT/US2010/028788 dated Mar. 13, 2012.

* cited by examiner

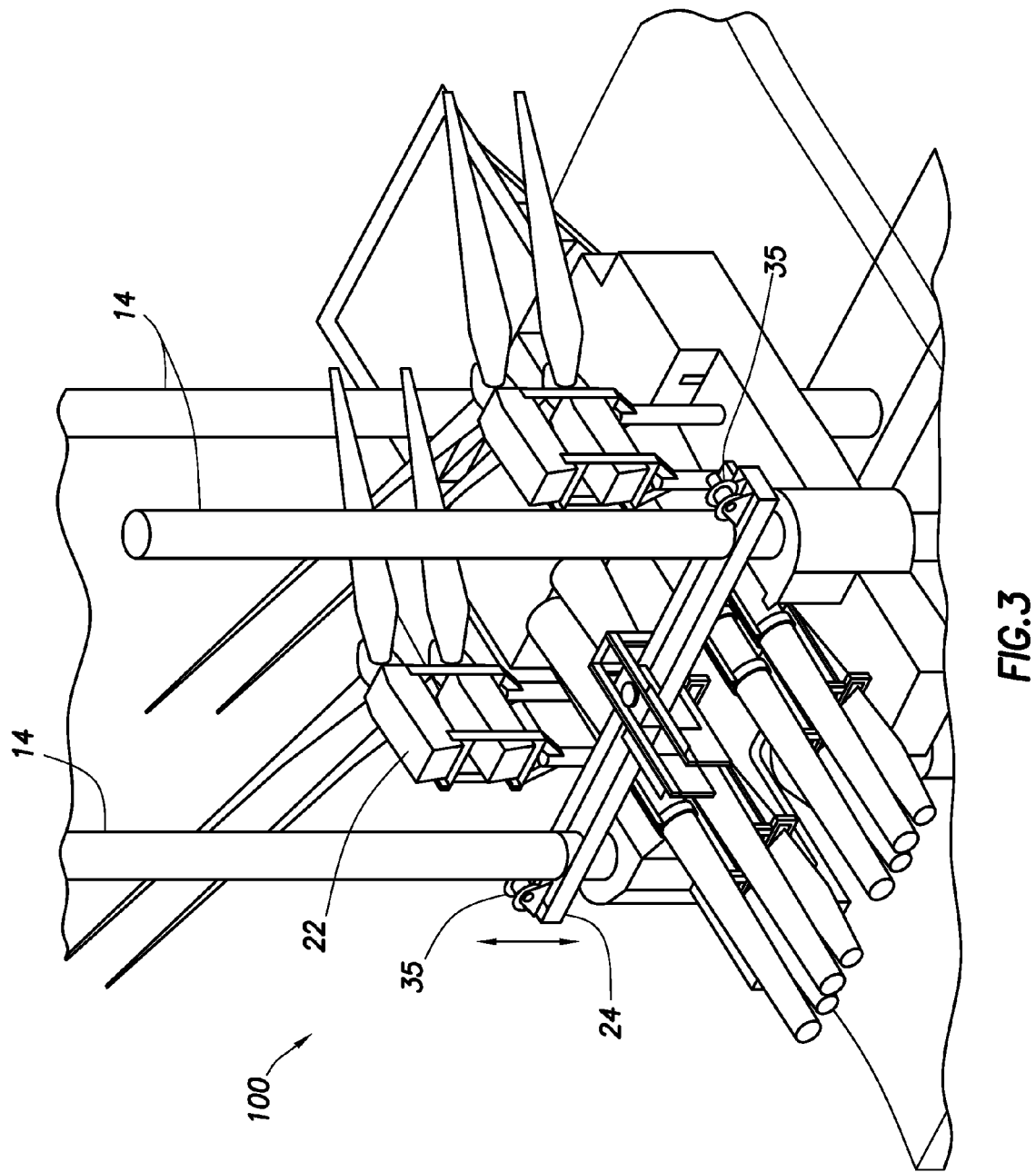

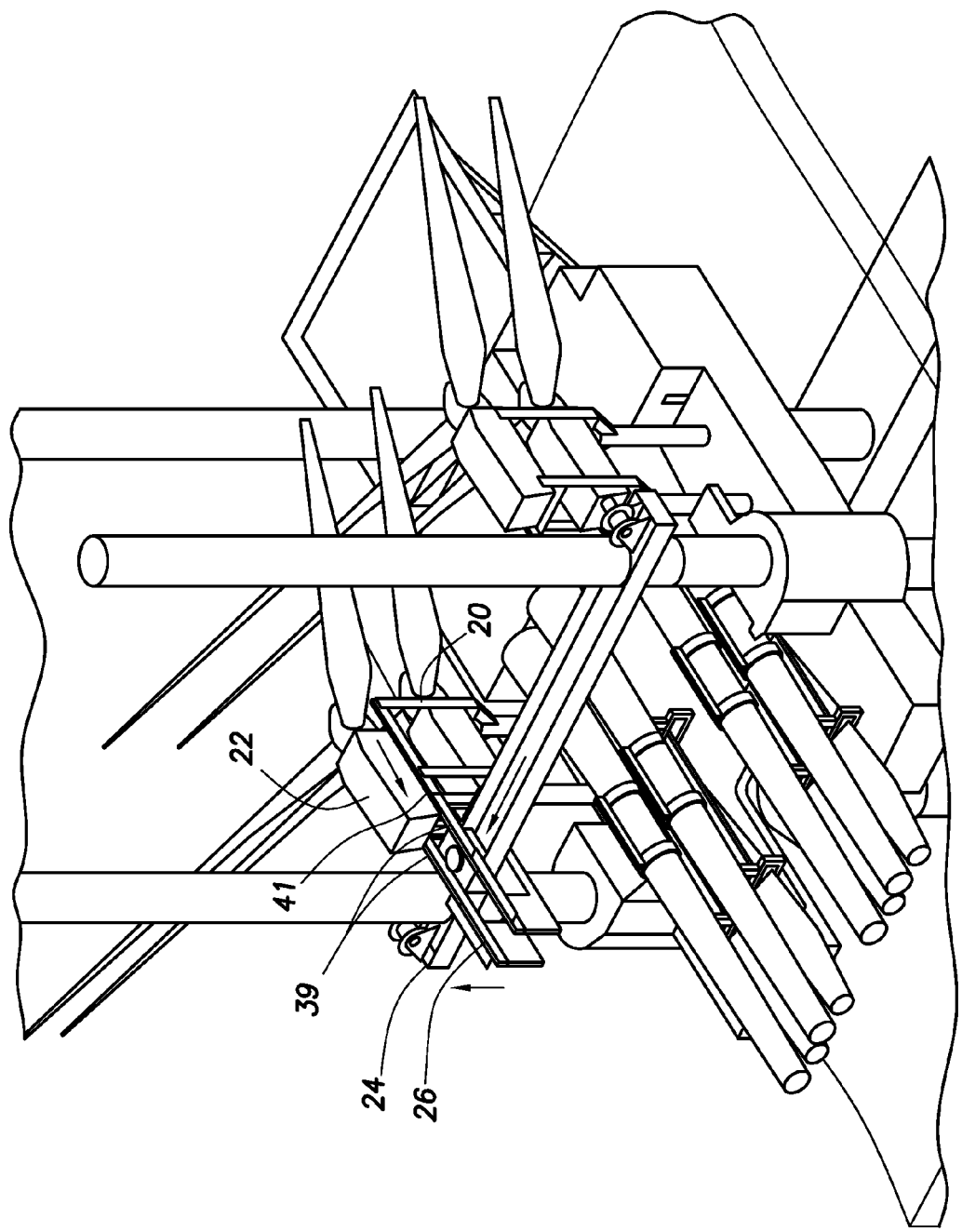

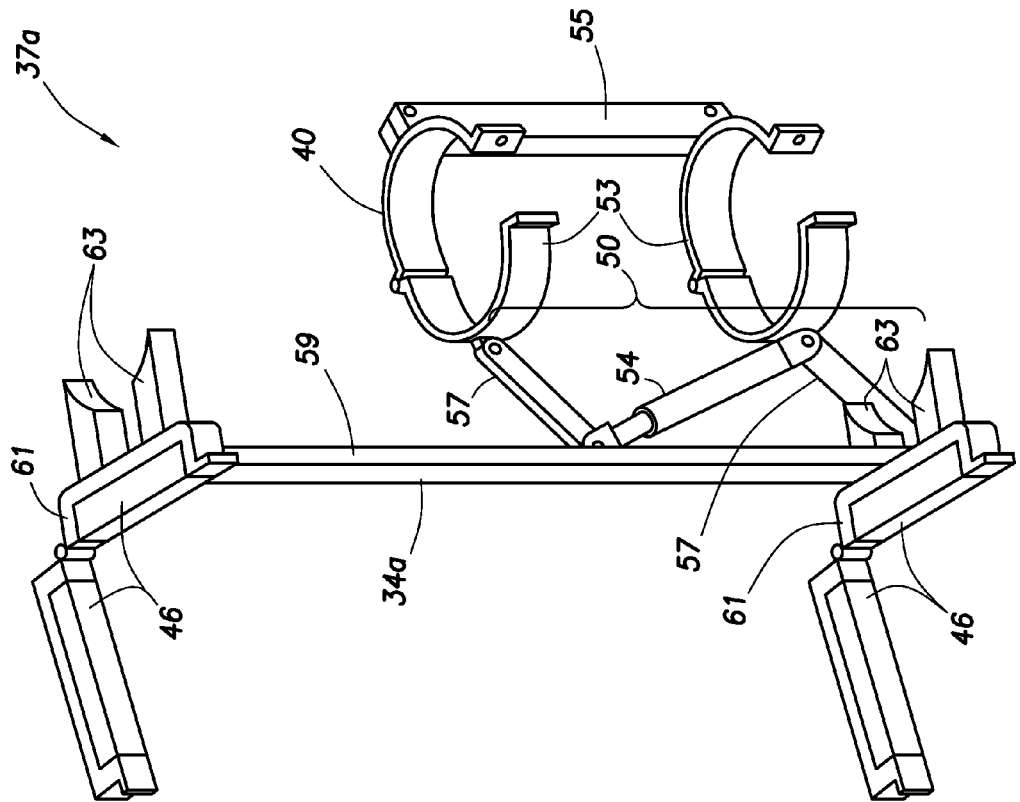
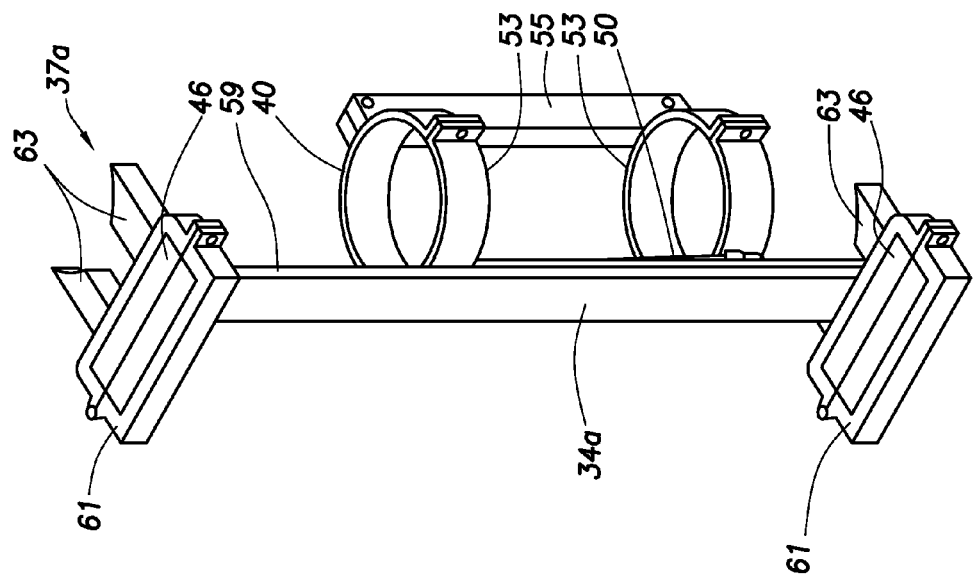

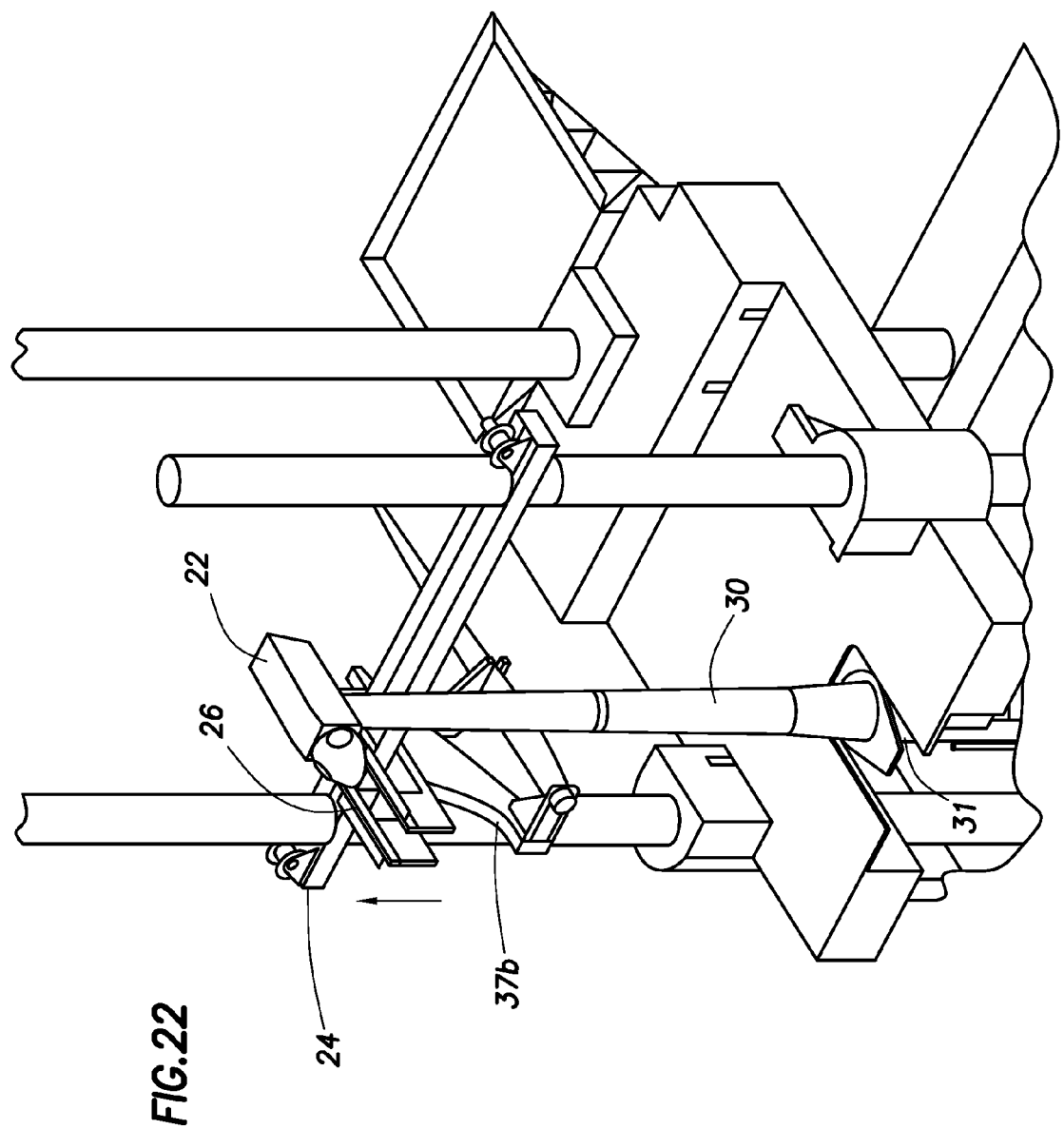

WINDMILL CONVEYANCE SYSTEM AND METHOD FOR USING SAME

CROSS REFERENCE TO RELATED APPLICATION

This application claims the benefit of U.S. Provisional Application No. 61/241,295, filed Sep. 10, 2009, and U.S. Provisional Application No. 61/256,498, filed Oct. 30, 2009, the entire contents of which are hereby incorporated by reference. Applicant has also filed co-pending U.S. Provisional Application No. 61/240,893 on Sep. 9, 2009, U.S. Non-Provisional Applications No. (not yet assigned) entitled WINDMILL HANDLING SYSTEM AND METHOD FOR USING SAME contemporaneously herewith, and U.S. Non-Provisional Applications No. (not yet assigned) entitled WINDMILL INSTALLATION SYSTEM AND METHOD contemporaneously herewith.

BACKGROUND OF THE INVENTION

1. Field of the Invention

The present invention relates to techniques for handling energy systems, such as windmills, wind turbines and/or other devices, used to convert wind into energy. Such handling may involve installation, storage and/or conveyance of the windmills.

2. Background of the Related Art

Conventional windmills (sometimes referred to as wind turbines) typically entail a tapered turbine tower and a wind turbine nacelle positioned on top of the tower. A wind turbine rotor with multiple wind turbine blades is connected to the nacelle through a shaft mechanism, which extends out of the nacelle.

Wind turbine towers (made up of tower units) can be several hundred feet tall, requiring heavy equipment to deliver to a location and/or construct on site, and presenting a high risk of injury to workers. Transporters, such as boats, have been used to transport the wind systems to locations, such as offshore facilities, for installation. Offshore windmill installation has been accomplished with large capacity cranes. In some cases, the cranes are used in combination with the transporter to transfer the windmill from the transporter and/or to install the windmill. These transporters and large cranes can pose a high safety risk when operated in high winds, which limits the window of delivery and/or installation to approximately a few months per year. Examples of windmill delivery and/or installation techniques are described in U.S. Pat. Nos. 4,311,434, 7,456,515, 7,112,010 and 7,234,409. Despite the existence of such techniques, a need remains for improved techniques to transport, transfer, store, assemble and/or install wind turbines.

SUMMARY OF THE INVENTION

In at least one aspect, the present invention relates to a conveyance system for delivering at least one component of a windmill to a location. The system is provided with a transporter and a transfer system. The transporter is positionable adjacent a base at the location. The transfer system is provided with a plurality of rails, a support and at least one slider. The rails are positionable on the base and the transporter. The support has a first portion of the rails of the transporter thereon. The support is positionable along a second portion of the rails on a surface of the transporter, and slidably movable between a retracted and an extended position whereby the support is selectively positionable adjacent the base. The slider carries the component(s), and is slidably movable along the rails of the transporter and the base whereby the component(s) is/are slidably transferrable between the transporter and the base.

In another aspect, the present invention relates to a conveyance system for delivering at least one component of a windmill to a location. The system is provided with a transporter for transporting the component(s) of the windmill to a base at the location, and a transfer system having at least one slider for carrying the component(s) of the windmill. The transporter has a plurality of transporter legs extendable therefrom for selectively lifting the transporter to a desired height. The slider is movable between the transporter and the base.

Finally, in another aspect, the present invention relates to a method of conveying at least one component of a windmill to a location. The method involves providing a conveyance system. The system is provided with a transporter for transporting the at least one component of the windmill to a base at the location, and a transfer system comprising at least one slider for carrying the component(s) of the windmill. The transporter has a plurality of transporter legs extendable therefrom for selectively lifting the transporter to a desired height. The slider is movable between the transporter and the base. The method further involves transporting the component(s) of the windmill to the location via the transporter, and transferring the component(s) of the windmill between the transporter and the base via the transfer system.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope, for the invention may admit to other equally effective embodiments. The Figures are not necessarily to scale and certain features and certain views of the Figures may be shown exaggerated in scale or in schematic in the interest of clarity and conciseness.

FIG. 1-26 are schematic depictions of a mobile turbine carrier and rigging system (sometimes referred to as the "rigging system") for installing a windmill, the rigging system having a base with three extendable platform legs and a handling system.

FIG. 1 shows the rigging system moving toward a base tower unit.

FIG. 2 shows the rigging system of FIG. 1 positioned adjacent the base tower unit, and with the base being 'Jacked up' by the platform legs.

FIG. 3 shows the rigging system of FIG. 2 with the base 'Jacked up' by the platform legs to the installation position.

FIG. 4 shows the rigging system of FIG. 3 with the handling system moved into position for receiving a nacelle, the handling system having a hoisting platform and a carrier.

FIG. 5A shows the hoisting platform of FIG. 4 with the carrier slidably positioned thereon via a trolley.

FIG. 6 shows the rigging system of FIG. 4 with the hoisting platform moved into position for connection to a tower unit via a handler.

FIG. 7 shows the rigging system of FIG. 6 with the hoisting platform after being connected to the tower unit via the handler.

FIGS. 8A-B show detailed views of the handler of FIGS. 6 and 7. FIG. 8A shows the handler in a closed position. FIG. 8B shows the handler in an open position.

FIG. 9 shows the rigging system of FIG. 4 with the hoisting platform carrying a nacelle and a tower unit.

FIG. 11 shows the rigging system of FIG. 10A with the tower unit in the vertical position for installation.

FIG. 12 shows the rigging system of FIG. 11 with the tower unit positioned in the base unit and the hoisting platform moved to a raised position.

FIG. 13 shows the rigging system of FIG. 12 with the nacelle rotated about the hoisting platform.

FIG. 15 is a detailed view of the hoisting platform of FIG. 14A with a work platform of the hoisting platform moved to a set position (the nacelle has been removed to show the features of the hoisting platform).

FIG. 16 shows the hoisting platform of FIG. 15 with the work platform returned to a retracted position.

FIG. 18 shows the rigging system of FIG. 17A with a bracing of the handler opened for removal from the tower unit therefrom.

FIG. 19 shows the rigging system of FIG. 18 with the hoisting platform moved to a lowered position, and the rigging system moving away from the base unit.

FIGS. 20-24 shows schematic views of an alternate handler.

FIG. 20 shows the riggings system of FIG. 14A with the hoisting platform supporting the alternate handler.

FIG. 21A shows the alternate handler supporting a blade. FIG. 21B shows the alternate handler with the blade removed. FIG. 21C shows the alternate handler in an open position.

FIG. 22 shows the alternate handler of FIG. 20 being lifted to a raised position by the hoisting platform.

FIG. 23 shows the alternate handler of FIG. 22 being rotated to a vertical position.

FIG. 24 shows the alternate handler of FIG. 23 being installed into a nacelle.

FIGS. 25-26 are schematic views of the rigging system of FIG. 1 with an alternate handling system having a rotatable hoisting platform. FIG. 25 shows the hoisting platform in a first position. FIG. 26 shows the hoisting platform rotated to a second position.

FIGS. 27-38 are schematic views of the rigging system of FIG. 1 and a windmill conveyance system, the windmill conveyance system comprising a lift boat with a plurality of boat legs and a transfer system. FIG. 27 shows the windmill conveyance system moving toward the mobile turbine and rigging system for delivery of a nacelle and a tower unit.

FIG. 28A shows the transfer system with a nacelle and a tower unit positioned thereon.

FIG. 29 shows the rigging and windmill conveyance systems of FIG. 27 with the windmill conveyance system docked with the rigging system and the boat legs extended from the lift boat.

FIG. 30 shows the rigging and windmill conveyance systems of FIG. 29 with the lift boat being 'Jacked up' by the boat legs to a tower transfer position, and the hoisting platform being moved to a raised position.

FIG. 31 shows the rigging and windmill conveyance systems of FIG. 30 with a tower unit being transferred from the windmill conveyance system to the rigging system and connected to a carrier thereof.

FIG. 32 shows the rigging and windmill conveyance systems of FIG. 31 with a carrier of the hoisting platform moving the tower unit about the rigging system.

FIG. 33 shows the rigging and windmill conveyance systems of FIG. 32 with the hoisting platform moving the tower unit onto the rigging system for storage.

FIG. 34 shows the rigging and windmill conveyance systems of FIG. 33 with the lift boat being 'Jacked up' by the boat legs to a nacelle transfer position, the hoisting platform being moved to a raised position and the carrier being shifted along the hoisting platform for transfer.

FIG. 35 shows the rigging and windmill conveyance systems of FIG. 34 with an upper support of the transfer system in an extended position for transfer.

FIG. 36 shows the rigging and windmill conveyance systems of FIG. 35 with the nacelle being transferred to the rigging system.

FIG. 37 shows the rigging and windmill conveyance systems of FIG. 36 with the upper support returned to the retracted position.

FIG. 38 shows the rigging and windmill conveyance systems of FIG. 37 with the nacelle being moved by the hoisting platform to pick up the tower unit, and the lift boat being lowered via the boat legs.

DETAILED DESCRIPTION OF THE INVENTION

Presently preferred embodiments of the invention are shown in the above-identified Figures and described in detail below.

Figure 1:
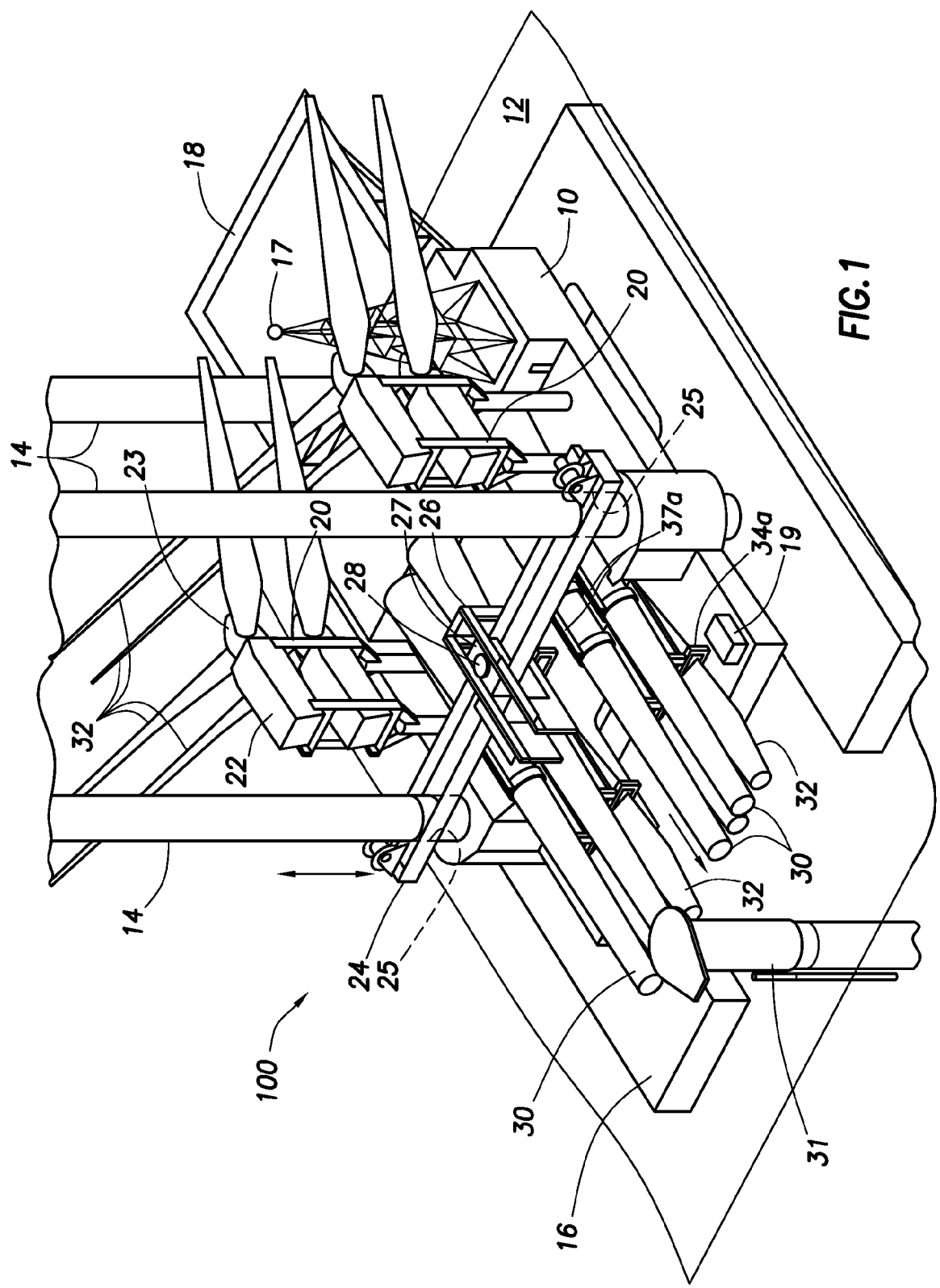

Aspects of the invention entail mobile turbine carrier and rigging system 100 (sometimes referred to as the "rigging system"). FIGS. 1-24 depict various schematic views of the rigging system 100. FIG. 1 shows a version of system 100 configured for offshore applications. While the rigging system 100 may be configured for offshore applications, it will be appreciated that the rigging system 100 may be also be used for onshore applications.

As seen in FIG. 1, a base 10 of the rigging system 100 is shown suspended above sea 12 level. The base 10 is shown configured with three extendable uprights or platform legs 14. A lower mat structure 16 is linked to platform legs 14 and suspended below sea level 12. The base 10 and/or mat structure 16 is/are configured to maintain the base afloat while the platform legs 14 are suspended off the sea floor. Some aspects may be implemented with more or less than three platform legs 14, depending on the layout and configuration of the base 10 and mat structure 16. The mat structure 16 is preferably suspended via the legs 14 a distance below the base 10. Preferably, the lower mat structure 16 provides stability and support to the rigging system 100 during operation.

The rigging system 100 of FIG. 1 is shown equipped with an optional crane 17, helicopter pad 18 and pile driver 19. Other devices may also be provided about the rigging system 100 for performing various operations, such as steering, driving or otherwise facilitating transport of the rigging system 100. In another example, handlers may be provided for storage and installation of components on the rigging system and/or to facilitate transfer of components onto the rigging system as will be described further below. Aspects of the base 10, platform legs 14, and mat structure 16, as well as other components of the invention, can be implemented using conventional oilfield "Jackup" rig components and hardware as known in the art.

The base 10 is equipped with several carrier supports 20, each configured to cradle one or more conventional wind turbine nacelles 22. This particular aspect of the invention is shown with each nacelle 22 outfitted with a pair of blades 32. A wind turbine rotor 23 is operatively connected to each nacelle to support one or more blades 32 thereon. As shown, multiple nacelles 22, each with two blades 32 thereon, are stacked on supports 20 positioned about the base 10. The supports 20 may be, for example, frames stacked using interlocking ends to secure the supports 20 in place on the base 10. One or more nacelles 22 with zero or more blades 32 may be positioned and/or stacked about the rigging system. The nacelles 22 may be stored with some of the blades 32 pre-installed as shown, or removed for separate storage and/or installation.

A handling system comprising a hoisting platform 24 is positioned between two of the platform legs 14. The hoisting platform 24 has two holes 25 therethrough for receiving the platform legs 14. The hoisting platform 24 is operatively connected to the two platform legs 14 and slidably movable therealong. The hoisting platform 24 is configured to run up and down along the platform legs 14, as further described below.

The hoisting platform 24 is further configured with a handling assembly or carrier 26 configured for movement along and with respect to the hoisting platform 24 via a trolley 27. Some aspects of the invention are equipped with a plunger 28 (described below). The carrier 26 is configured to receive windmill components, such as nacelles 22, blades 32 and/or towers units 30, for transport about the rigging system 100. The carrier 26 is also configured to position the windmill components for installation, storage, etc.

A plurality of tower units (sometimes referred to as towers or posts) 30 are mounted below the hoisting platform 24. The tower units are supported on base 10 by a handler 37a. Each tower unit 30 has a single blade 32 held in place by a brace or blade saddle 34a of the handler 37a. Some aspects may be implemented with each tower unit 30 equipped with one or more blade saddles 34a. Other aspects may also be implemented with blade saddles 34a configured to hold one or more blades 32.

It will be appreciated by one of skill in the art that one or more nacelles, blades, tower units and/or other components or devices may be positioned at various locations about the rigging system 100. The platform legs 14 and/or hoisting platform 24 may also be positioned at various locations. For example, one or more hoisting platforms 24 may be positioned between one or more pairs of platform legs 14 located about the rigging system 100.

FIG. 1 shows the rigging system 100 being moved to a location for installation of a windmill (or wind turbine tower assembly). The rigging system 100 may be towed, driven or otherwise transported to a desired location. The rigging system 100 is configured to transport one or more windmills to one or more desired location(s) for installation. One or more rigging systems may be transported separately or in combination.

As shown in FIG. 1, a base tower unit 31 may be provided at the location for receiving and supporting the windmill. The base tower unit 31 is shown extending above sea 12 level. It will be understood that the base tower unit 31 may be installed on site using conventional means as known in the art. For example, the base tower unit 31 may be transported to the location via the rigging system 100, and installed using pile driver 19. The base tower unit 31 is provided for receiving and supporting the windmill as will be described further below.

The rigging system 100 is depicted in FIG. 1 as carrying multiple windmills disassembled into several components or portions. The windmill components comprise wind turbine nacelles 22, tower units 30 and blades 32. One or more components of one or more windmills, as well as other devices, may be transported, assembled, used and/or installed by the rigging system 100. One or more of the component(s) may be transported in a disassembled, partially assembled, or fully assembled configuration, as needed. Personnel may also be transported with the rigging system 100.

Figure 2:
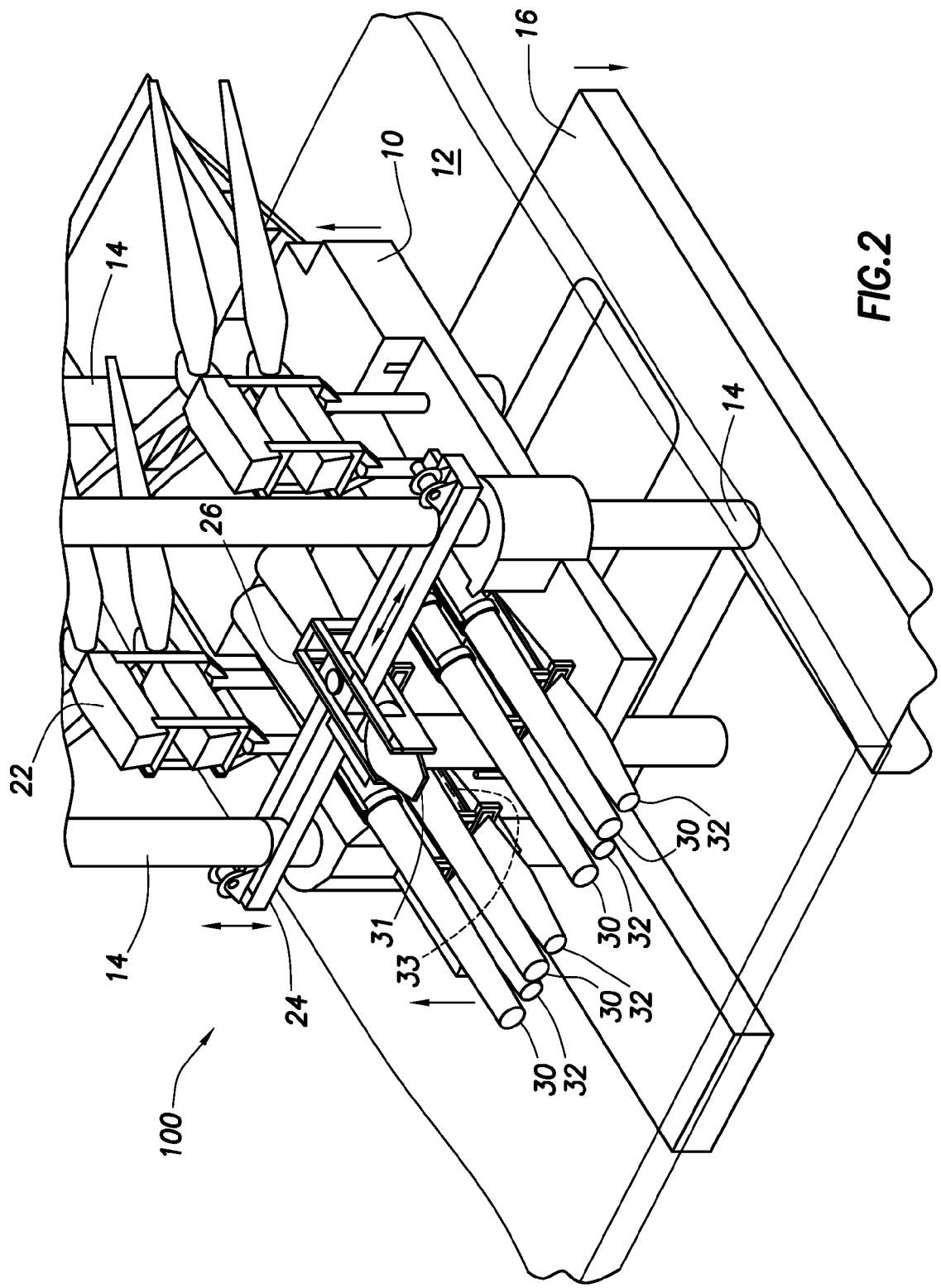

FIG. 2 shows the rigging system 100 in position over the base tower unit 31. Once in position, the platform legs 14 are extended to raise or Jackup the base 10 to the desired height and to provide stability. As the platform legs 14 are extended, the mat structure 16 is lowered to the sea floor to provide a stable support for the rigging system 100. The platform legs 14 may be extended such that the base 10 is raised to a desired height for installation.

The base 10 is preferably provided with an inlet portion 33 for receiving the base tower unit 31. The rigging system 100 is positioned such that the carrier 26 of the handling system is adjacent to the base tower unit 31. In this position, personnel may access the base tower unit 31 as needed in preparation for the installation operation.

With the rigging system 100 in place over the base tower unit 31, the hoisting platform 24 may be raised or lowered to perform handling operations. The carrier 26 positioned on the hoisting platform 24 may be moved laterally back and forth along the hoisting platform and perpendicular thereto. The hoisting platform 24 and carrier 26 may be positioned to pick up components, such as a nacelle 22, tower unit 30 and blade 32.

As shown in FIG. 3, aspects of the invention may be equipped with a pair of winches 35 mounted on the ends of the hoisting platform 24. Activation of the winch(es) 35 raises and lowers the hoisting platform 24. Conventional winch/pulley systems may be used on embodiments of the invention. Other aspects may be implemented with the winch(es) mounted at the top of the platform leg(s) 14. While winches are depicted in FIG. 3, it will be appreciated that other mechanisms may be used to facilitate movement of the hoisting platform 24 along platform legs 14. Winches, cranes or other mechanisms may also be provided about other positions the rigging system 100 for performing various operations, such as installation.

FIG. 4 shows the carrier 26 moved into position to pick up a desired nacelle 22. The carrier 26 is raised by hoisting platform 24 to a height such that the carrier 26 is in vertical alignment with the support holding the nacelle 22. The carrier 26 is then slid along the hoisting platform 24 to a position in horizontal alignment with the support 20 holding the nacelle 22. The carrier 26 may be extended to a position adjacent to the support 20. In this position, the carrier is aligned for receiving the nacelle 22.

Once in position, the nacelle 22 is moved onto and supported by the carrier 26. The nacelle 22 can be moved onto the carrier 26 using any suitable means (e.g., via a winch mounted on the carrier 26, not shown). As shown, the nacelle 22 is slidably moved from the support 20 to the carrier 26 along rails 39. Preferably, the rails 39 are configured for alignment with the supports 20 to facilitate transfer therebetween. A slider 41 is provided to slidingly move the nacelle 22 along the rails 39. In some aspects of the invention, the carrier 26 and/or the carrier supports 20 may be configured with conventional gear/track systems to allow for movement or extension of the components to facilitate the hand off of the nacelle 22. Devices, such as bearings, sliders, rails or other mechanisms, may be provided on the carrier and/or support for facilitating transfer of the nacelle therebetween.

Figure 5A:
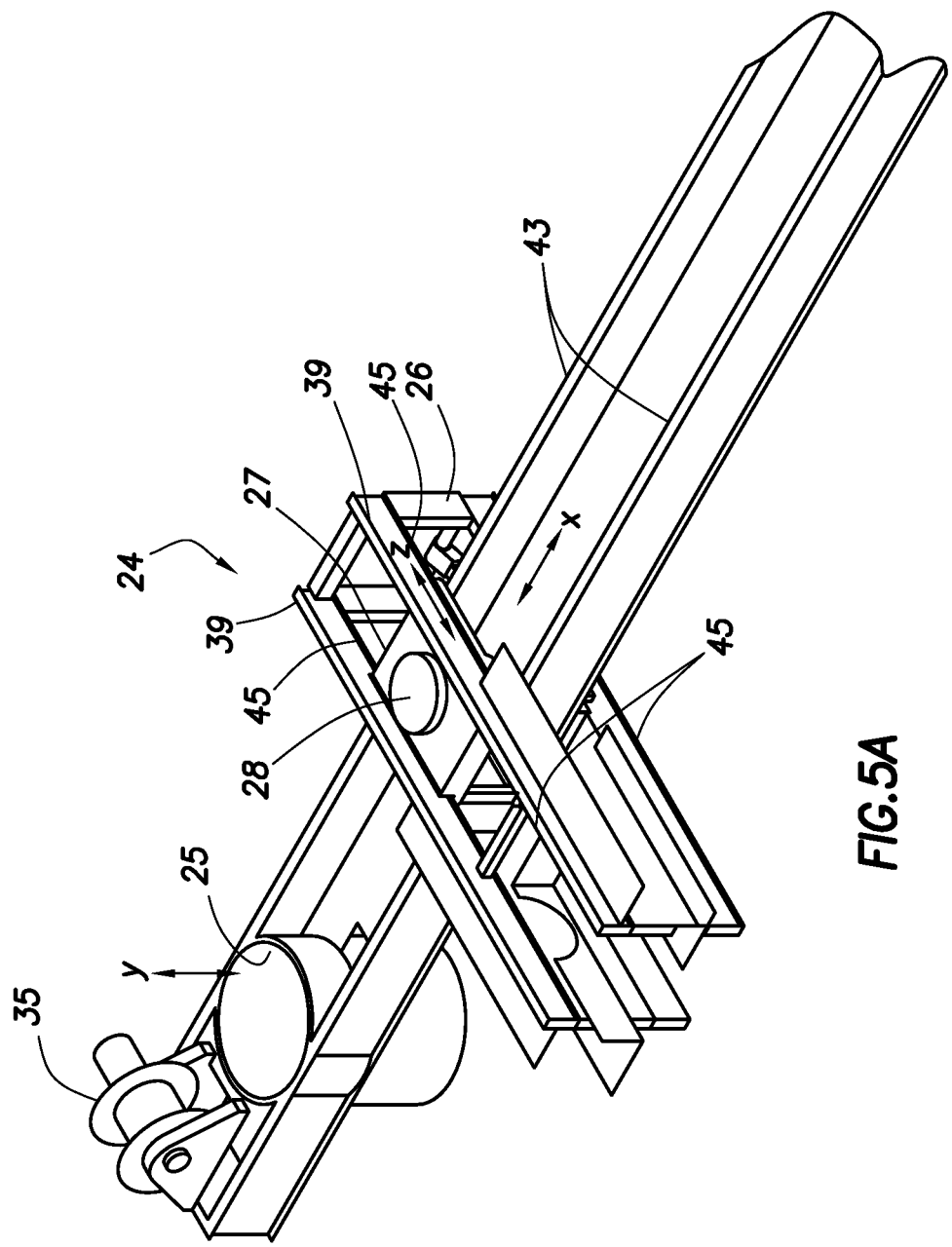
FIGS. 5A,B,C are detailed views of the carrier of FIG. 4.

FIGS. 5A,B,C show detailed views of the hoisting platform 24 with carrier 26 thereon. These figures depict the movement of the hoisting platform 24 and carrier 26 in the X, Y and Z directions. The hoisting platform 24 has holes 25 near each end thereof for receiving platform legs 14 (FIGS. 1-4) for slidable movement therealong in the Y direction as shown. Winches 35 are provided to facilitate such movement.

The carrier 26 is slidably connected to the hoisting platform 24 via trolley 27. The hoisting platform 24 is an elongated member having rails 43 receivable by trolley 27 for slidable movement therealong in the X direction along hoisting platform 24 as shown. As shown in FIGS. 5A and 5B, carrier 26 has inner rails 45 slidably receivable by trolley 27 to allow movement of the carrier 26 along trolley 27 in the Z direction perpendicular to the hoisting platform 24 as shown. Upper rails 39 may be used for slidably receiving nacelle 22 on slider 41 (FIG. 4).

Figure 5C:
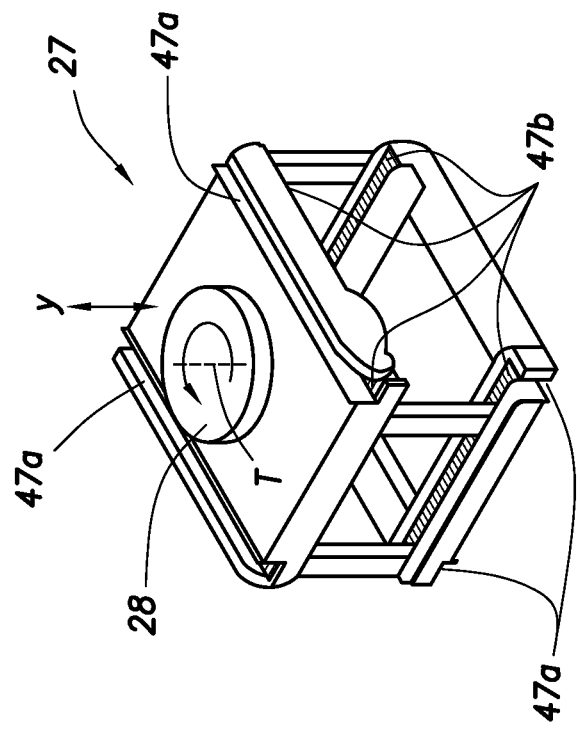
FIG. 5C shows the trolley alone.
Figure 5B:
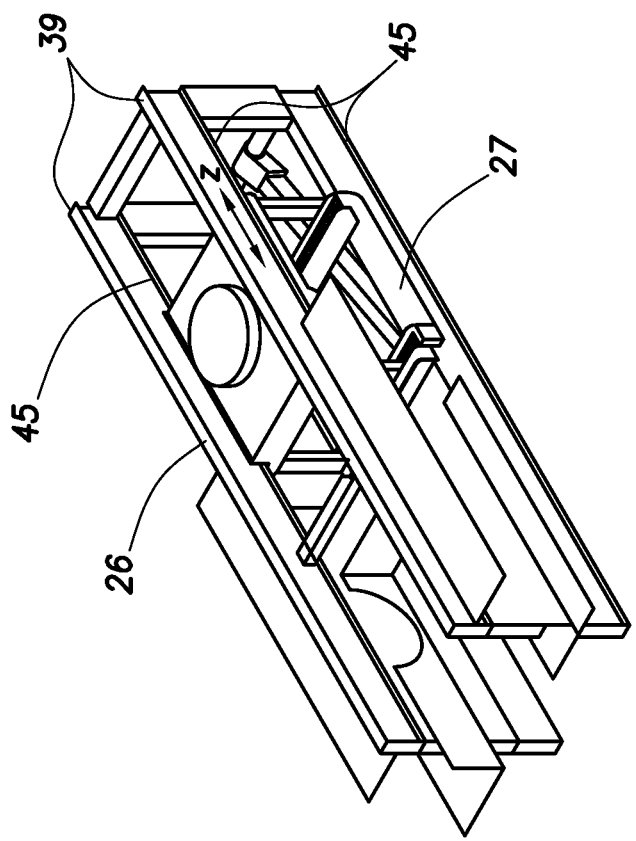
FIG. 5B shows the carrier of FIG. 5A with the hoisting platform removed.

FIG. 5C shows the trolley 27 in greater detail. The trolley 27 is shown having outer rails 47a for receiving the carrier 26, and inner rails 47b for receiving the hoisting platform 24. The trolley 27 is also provided with a plunger that is movable in the Y direction and rotatable about an axis T. The plunger 28 enables the lifting and rotation of a windmill component, such as a nacelle, (not shown) when placed thereon as will be described further below.

Figure 6:
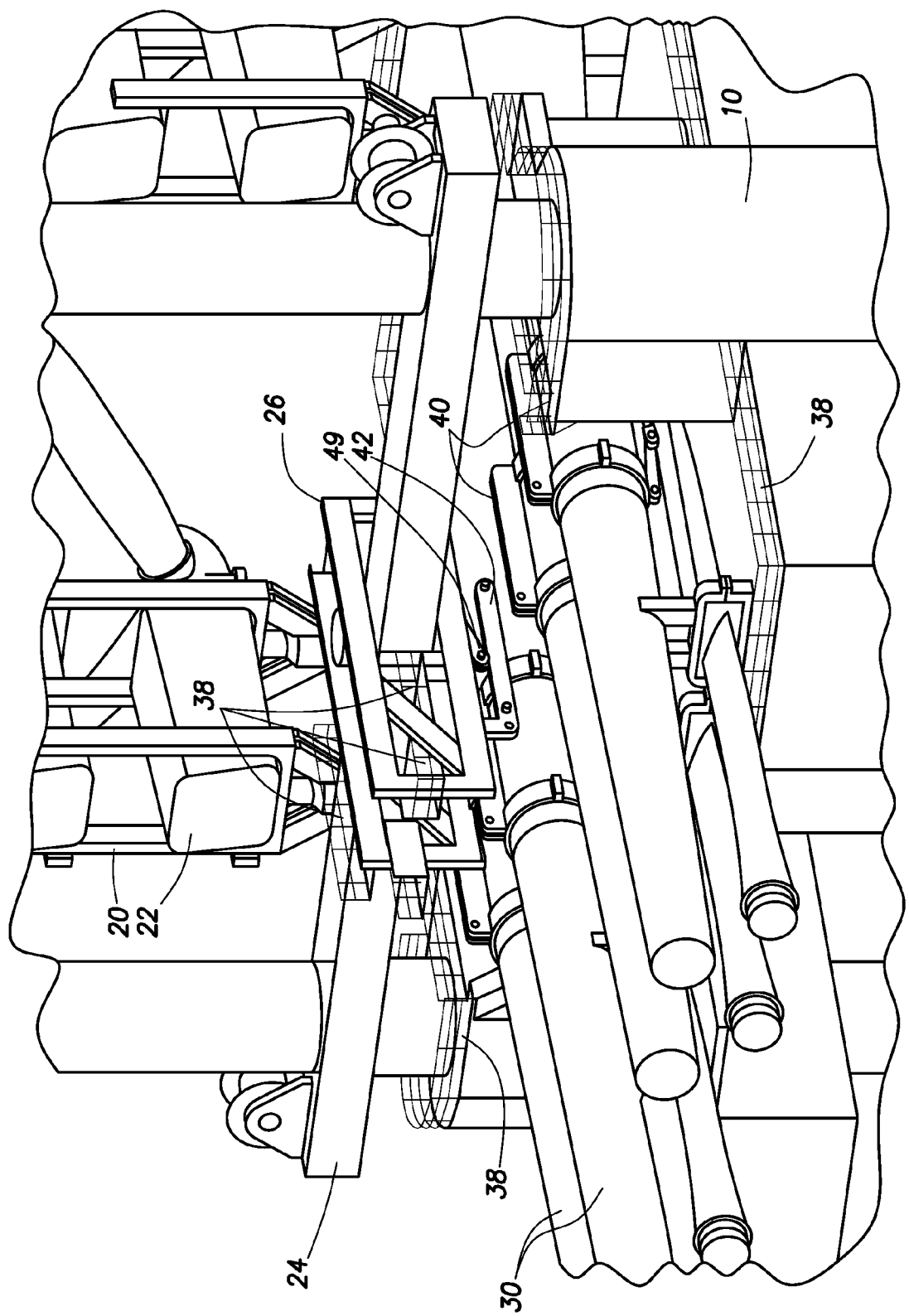
Figure 7:
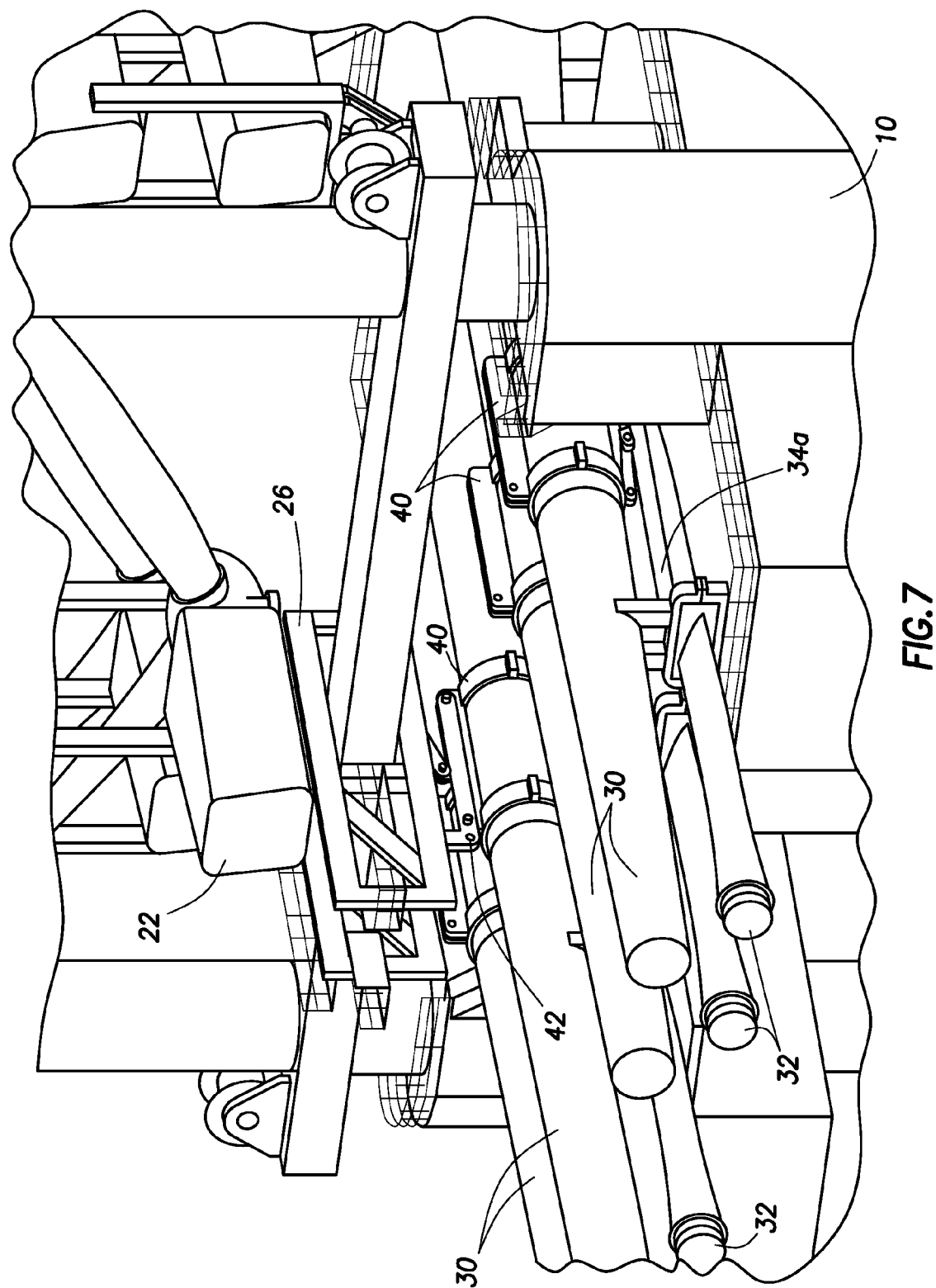

FIGS. 6 and 7 show a close-up view of carrier 26 positioned to pick up tower unit 30. The carrier 26 is positioned about the hoisting platform 24 for slidable movement therealong. FIG. 6 also shows the various railings/ladders/walkways and/or other access ways 38 that may be disposed on the base 10, carrier supports 20, and carrier 26 as desired to provide and facilitate safe crew access and movement.

The carrier 26 is provided with handling arm 42 extending from a bottom side of the carrier 26. The handling arm 42 is pivotally mounted to the carrier 26 and selectively extendable therefrom via piston 49. As shown in FIG. 6, the carrier 26 is positioned adjacent a tower unit 30 with the handling arm 42 in a collapsed position for receiving the tower unit 30.

Each tower unit 30 is equipped with a bracing 40 to facilitate handling of the tower units. FIG. 7 shows the handling arm 42 positioned beneath the carrier 26 to couple with the bracing 40 a tower unit 30. The bracing 40 extends about the tower unit to grippingly engage the tower unit for transport. The handling arm 42 may be coupled to the bracing 40 using bolts or other mechanisms.

The bracing 40 is coupled to a blade saddle 34a. The blade saddle 34a is positioned beneath the tower unit 30 as it lies in the stored position. The blade saddle 34a provides support for the tower unit 30 and provides storage for a blade 32 therebelow. The blade saddle 34a acts as a support for keeping the tower unit 30 and blade 32 secure in a stored position during transport and installation. The blade saddle is configured to rest on a surface, such as the base 10 as shown. The blade saddle 34a is also shaped to conform to the shape of the tower unit 30 and to resist movement of the tower unit 30 from its stored position.

The towers units 30 are shown in a stored position on base 10. The tower units 30 and blades 32 are preferably stored in a stable position and for easy access during installation. As shown, the tower units 30 are positioned below the carrier 26 for retrieval thereof, but may be positioned at various locations about the base. In this version, a nacelle 22 has been mounted atop the carrier 26 with the tower unit 30 connected below.

FIGS. 8A, B show the handler 37a for storing a tower unit 30. The handler 37a comprises bracing 40 for grippingly engaging a tower unit 30, and a blade saddle 34a for receiving a blade 32. The bracing 40 comprises a pair of grips 53 operatively connected to a gripper bar or bracket 55. Each grip 53 is positionable about a tower unit 30 for grippingly engaging and supporting the tower unit 30 from the gripper bar 55. The grips 53 are hinged such that they may open to receive the tower unit 30, and lock thereabout (via bolts or other means not shown). FIG. 8A shows the grips 53 in the closed position. FIG. 8B shows the grips 53 in the open position.

The bracing 40 is operatively connected to the blade saddle 34a and selectively extendable therefrom via a telescoping member 50 of blade saddle 34a. The telescoping member 50 may include linkages, such as piston 54, to facilitate movement of the bracing from a collapsed or stowed position as shown in FIG. 8A to an extended position as shown in FIG. 8B. The telescoping member 50 may be bolted or otherwise connected to the bracing 40 and blade saddle 34a. The telescoping member 50 is preferably selectively extendable to permit extension of the blade saddle 34a from the bracing 40 as will be described more fully below.

The blade saddle 34a is provided with a saddle bar 59 with a pair of feet 61 at each end thereof. The feet 61 have tower supports 63 thereon. The tower supports 63 are shaped to receive the tower unit 30 and hinder lateral movement thereof when in the stored position. As shown, the tower supports 63 are a pair of arms having an arcuate end for receiving the tower unit 30, but may be of other shapes and configurations sufficient to receive and support the tower unit 30.

The feet 61 of the blade saddle 34a are preferably hinged to open for receipt of a blade (e.g., 32 of FIG. 7). The feet 61 are movable between a closed position as shown in FIG. 8A and an open position as shown in FIG. 8B. As shown in these figures, the feet 61 may be provided with inserts 46 to grippingly engage and protect the blade. The inserts may be made of rubber or other material for supporting and/or protecting the blade. The feet 61 also function to support the tower unit 30 and/or blade 32 on the base 10 as shown in FIG. 7.

Figure 9:
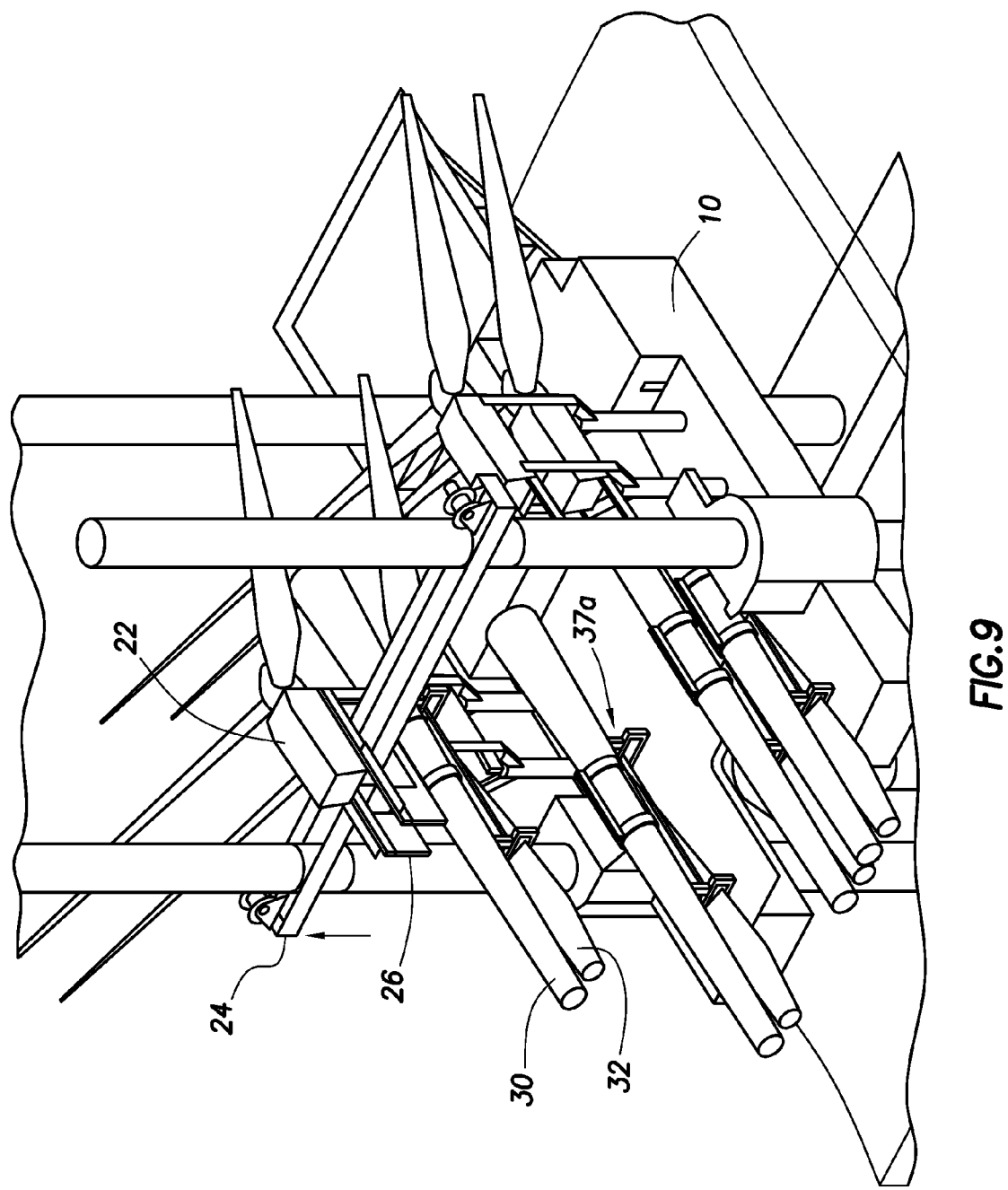

Referring now to FIG. 9, with the nacelle 22 mounted atop the carrier 26 and the tower unit 30 connected below, the wind turbine and tower unit are raised together. Components of the windmill, such as the nacelle 22, tower unit 30 and/or blade 32 may be moved about the base 10 separately or together. The hoisting platform 24 is shown carrying the nacelle 22 and tower unit 30 to a raised position for installation.

Figure 10A:
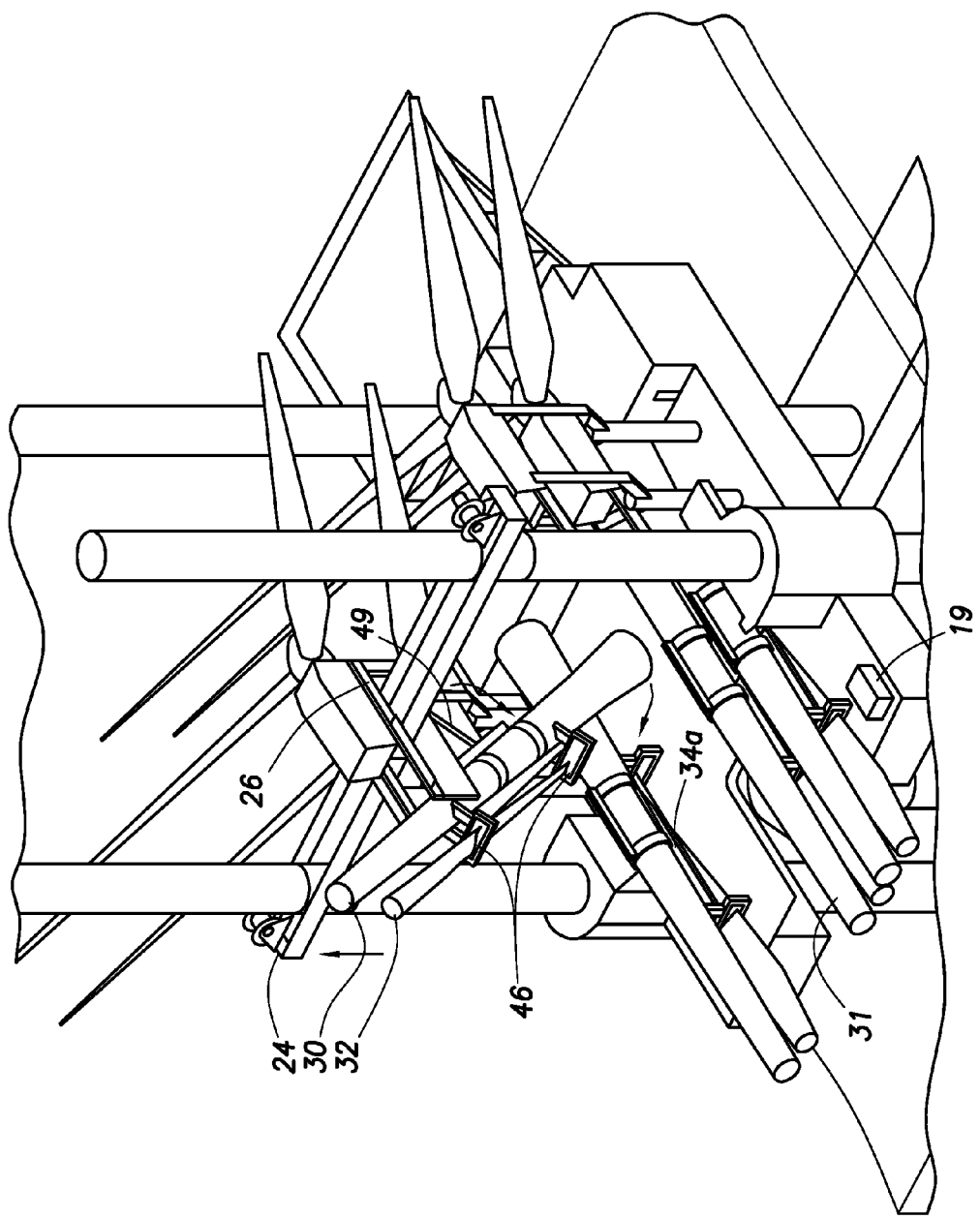
FIG. 10A shows the rigging system of FIG. 9 with the hoisting platform tilting the tower unit into position for installation.

FIG. 10A shows the tower unit 30 and blade 32 in transition to an upright position. The carrier 26 has been shifted along the hoisting platform 24 to a position over the base tower unit 31. Once in the desired position, the handling arm 42 may be activated to position the tower unit 30 for installation. As seen in FIG. 10A, the blade saddle 34a is preferably outfitted with inserts 46 to hold the blade 32 in place without damaging the blade.

Figure 10B:
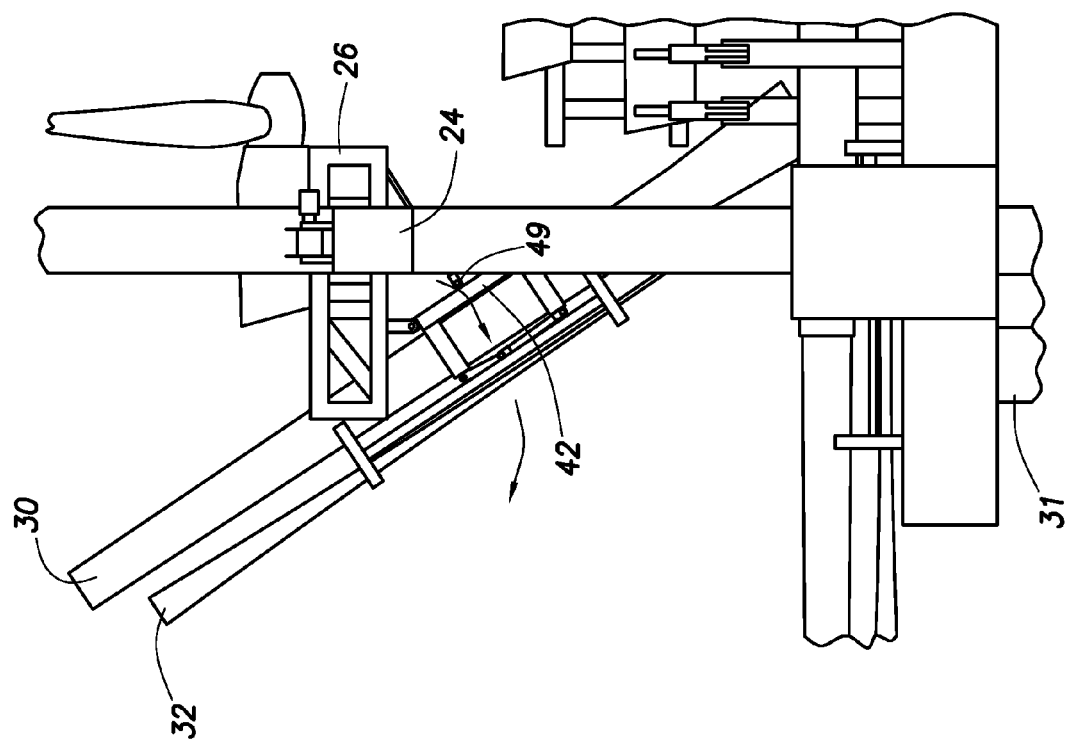
FIG. 10B shows a side view of the hoisting platform of FIG. 10A.

FIG. 10B is a side view, showing the handling arm 42 extending out to pivot the tower unit 30 to an upright position. Aspects of the invention may be implemented with any suitable handling arm 42 or extension mechanism as known in the art (e.g., pneumatic, hydraulic, electric servos, etc.) The piston 49 is provided to extend the arm from the collapsed position to an extended position as shown.

Figure 11:
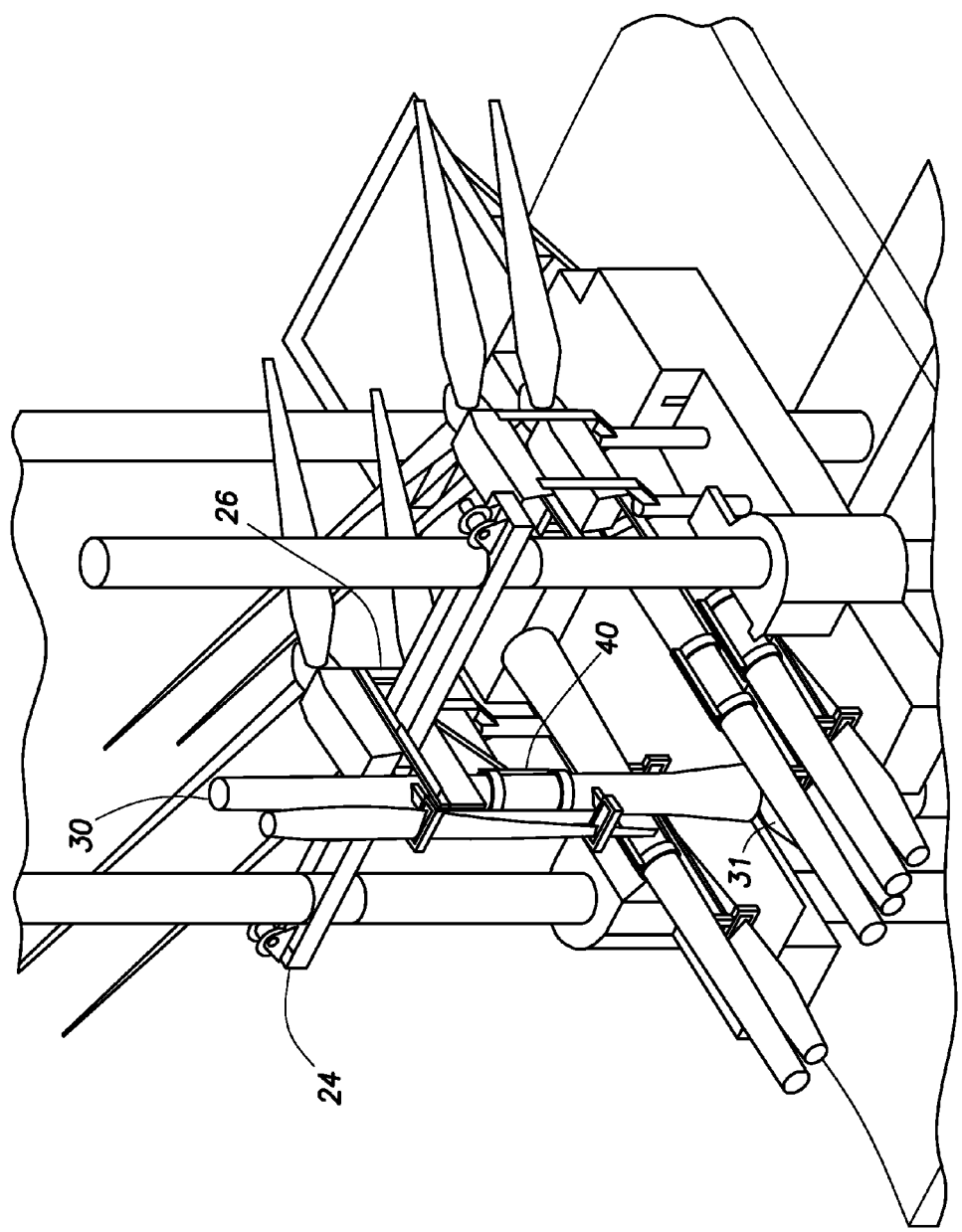

Once the tower unit 30 is vertical and in place, the tower unit 30 is secured to the base tower unit 31, and the carrier 26 is uncoupled from the tower unit 30, as shown in FIG. 11. The tower unit 30 may be attached to the base tower unit 31 using conventional means to form a tower. Once attached, the handling arm 42 of the carrier 26 is uncoupled from the bracing 40 of the tower unit 30, thereby reversing the coupling as described with respect to FIGS. 6 and 7.

While the tower unit 30 is shown being installed in the base tower unit 31, it will be appreciated that the tower unit may be installed directly into a foundation, such as the sea floor, at the location. In some cases, the foundation may be reinforced or provided with a structure for receiving the windmill. The rigging system 100 may also be used to install the base tower unit 31, if present. The tower unit, foundation and/or other vertical components may be separated into smaller components or combined prior to installation. Other devices, such as pile drivers 19, may be provided to facilitate installation.

Figure 12:
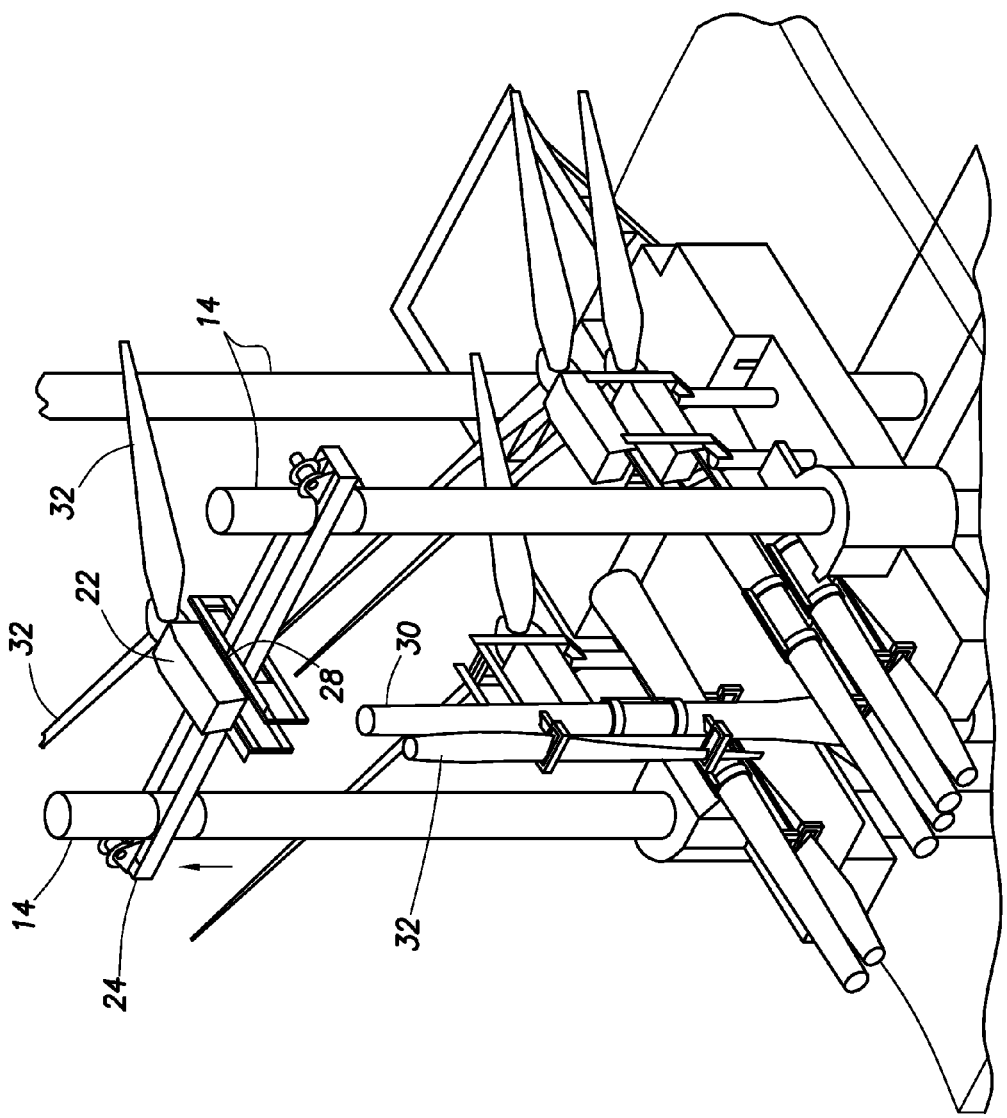

The hoisting platform 24 is then raised to suspend the nacelle 22 above the tower unit 30, as shown in FIG. 12. FIG. 12 shows a case wherein the blades 32 on the nacelle 22 extend out beyond the platform legs 14. In order to place such a nacelle 22 on the upright tower unit 30, it is necessary to either remove the blades 32 or move to rotate the nacelle 22. In one aspect, the nacelle 22 is rotated without removal of the blades 32. To enable rotation, the hoisting platform 24, with the nacelle 22 thereon, is raised to a position such that the nacelle 22 may be rotated without contact between the platform legs 14 and the blades 32.

Figure 13:
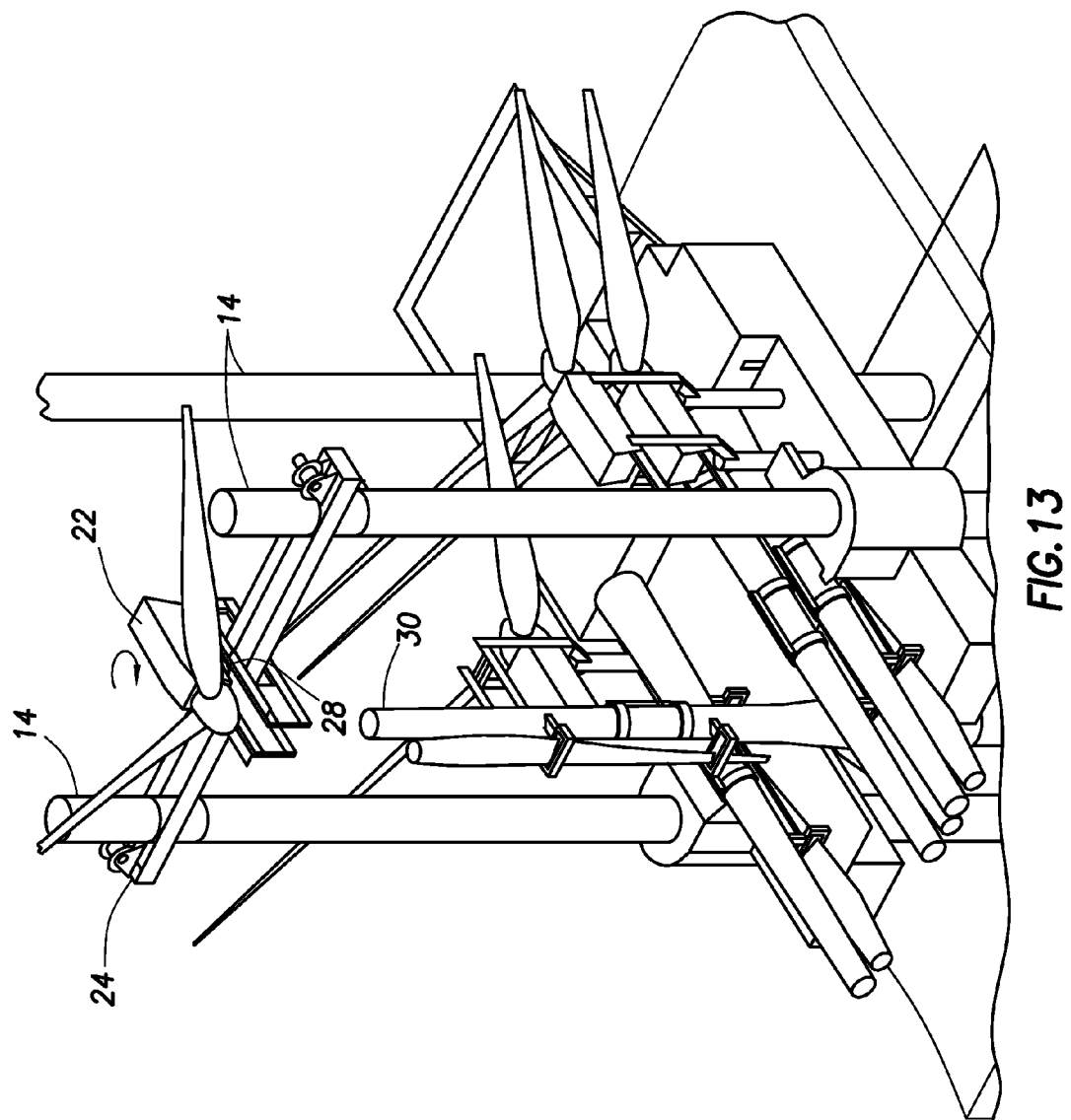

In one aspect, the nacelle 22 may be rotated using the plunger 28. The plunger 28 comprises a bearing allowing it to rotate and thus pivot the nacelle 22 supported thereon. Plungers 28 may also be configured to extend or retract for additional positioning control. The plunger 28 may be implemented using conventional mechanisms (e.g., hydraulic/pneumatic/gear-driven pistons, etc.) FIG. 13 shows the nacelle 22 after it has been rotated to clear the platform legs 14. With the nacelle 22 rotated, the platform 24 is lowered to set the nacelle 22 on the tower unit 30. The nacelle 22 may optionally be rotated by the plunger 28 before picking up and/or installing the tower unit 30.

Figure 14B:
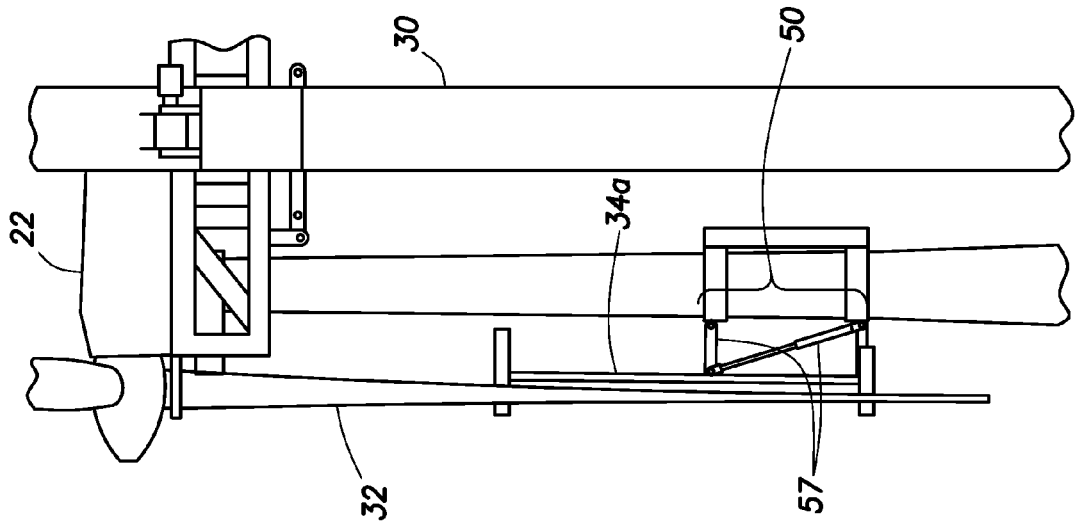
FIG. 14B shows a side view of the hoisting platform of FIG. 14A.
Figure 14A:
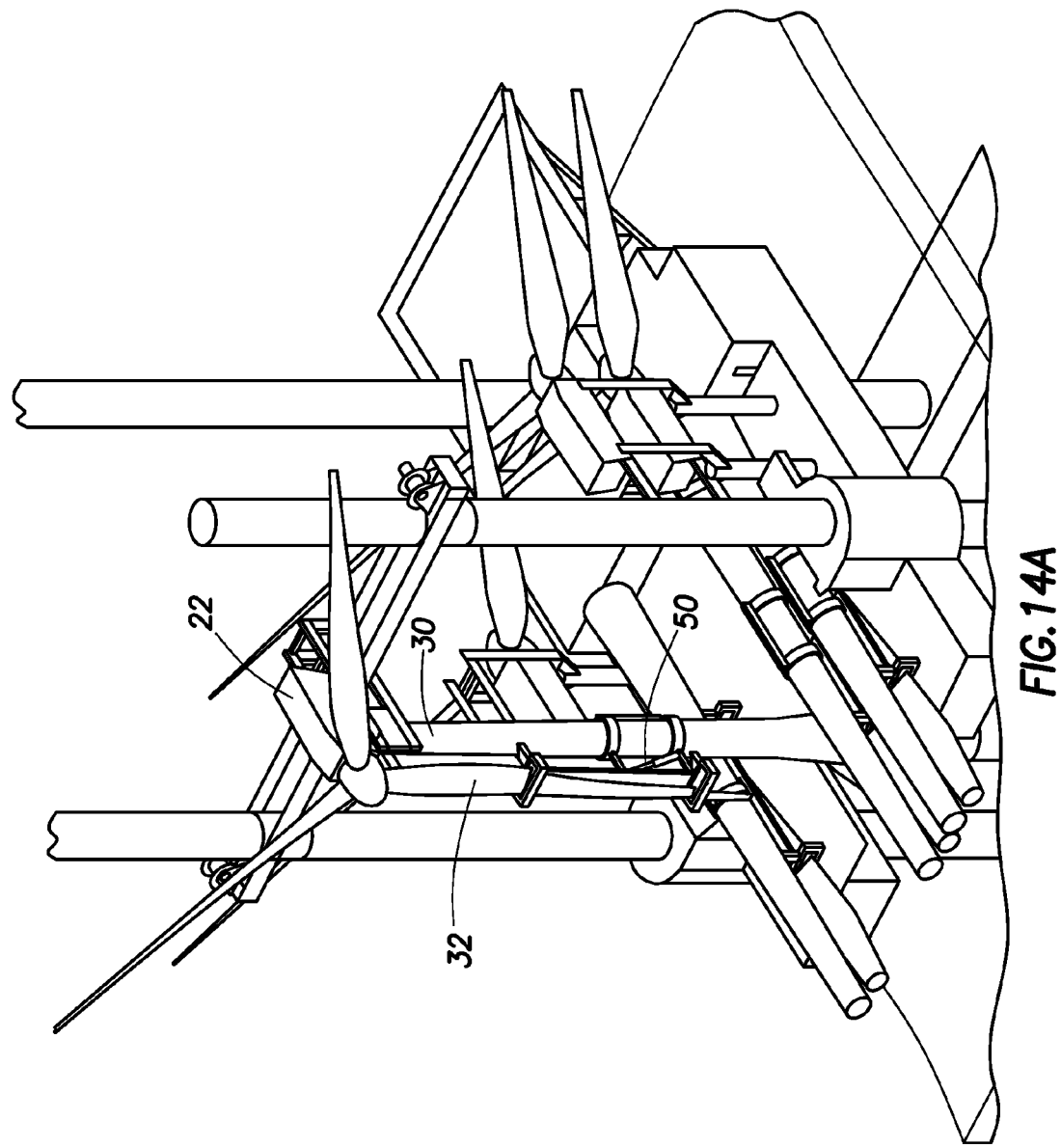
FIG. 14A shows the rigging system of FIG. 13 with the hoisting platform lowered for installation of the nacelle onto the tower.

FIG. 14A shows the nacelle 22 positioned and secured to the tower unit 30. FIG. 14B is a side view showing the blade 32 being raised for attachment to the nacelle 22. The blade saddle 34a is shown with a telescoping member 50 (e.g., pneumatic, hydraulic, electric servos, etc.) configured to lift the blade 32 into position for mounting. The telescoping member 50 extends to move the blade saddle 34a from a stowed position to an extended position for installation of the blade 32 into the nacelle 22. The telescoping member 50 may also be configured to hold the blade 32 at an angle during mounting to a nacelle 22 configured to accept the blade 32 at an angle. As shown, the telescoping member 50 comprises linkages 57 to enable extension of the blade saddle 34a to the desired position.

Figure 15:
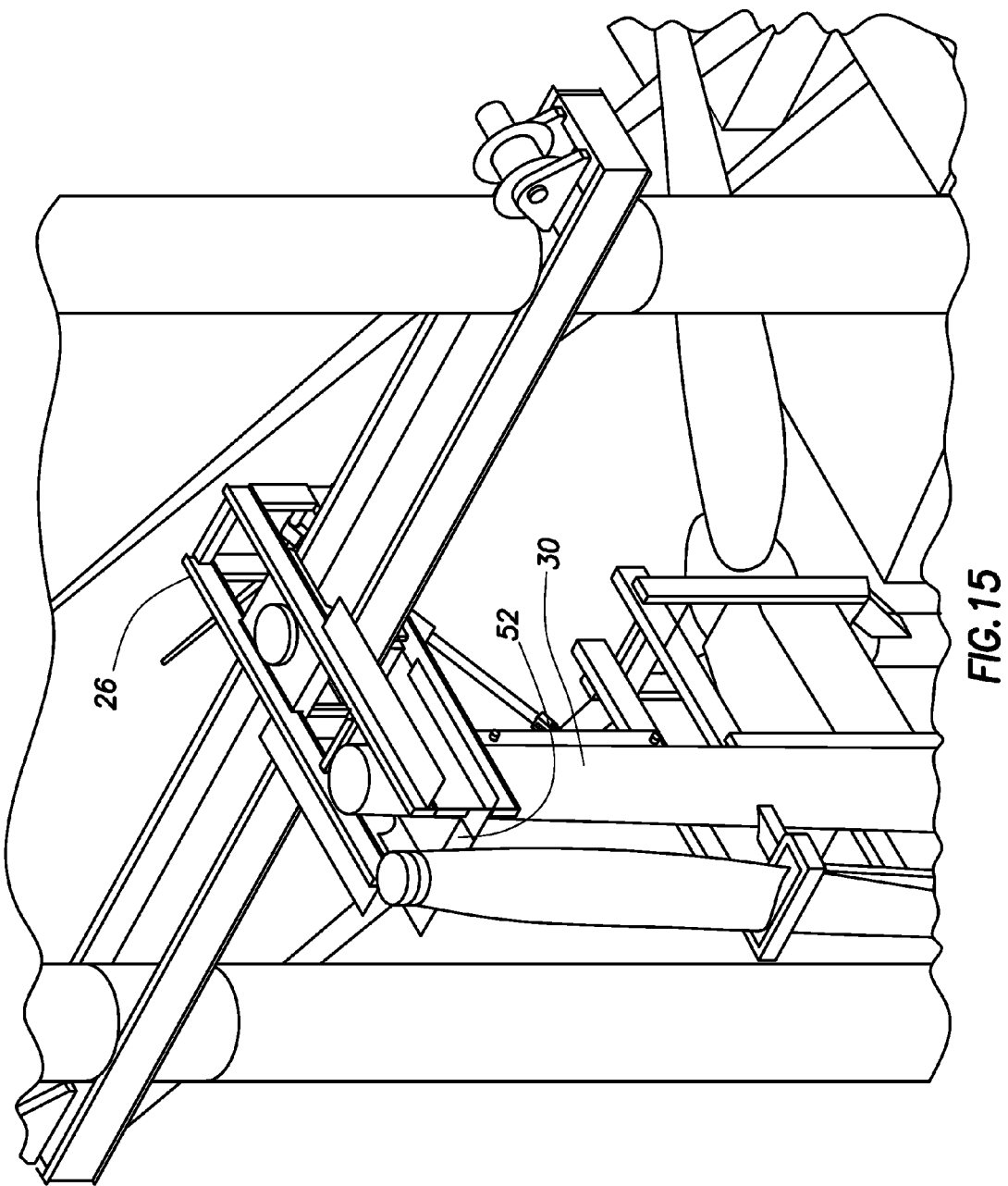
Figure 16:
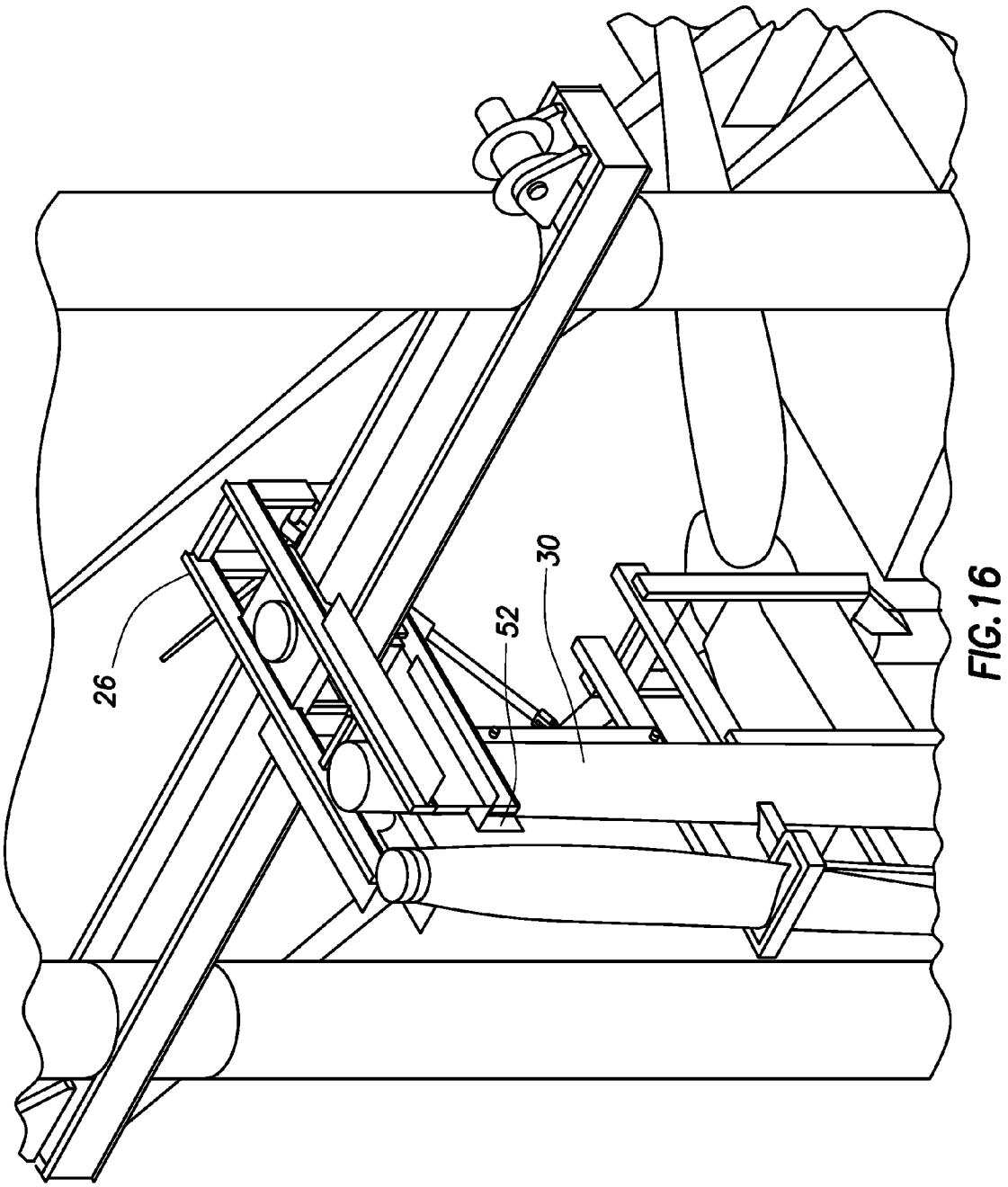

FIGS. 15 and 16 show close-up views of the turbine assembly in place with the nacelle 22 (of FIG. 14A) removed. These figures depict the operation of work platforms 52. The nacelle 22 is not shown in these for clarity of explanation. As also shown in these figures, the tower unit 30 may optionally be installed before retrieving the nacelle 22 for installation.

FIG. 15 shows the work platforms 52 on the carrier 26 in the set position to facilitate crew movement thereon. The work platforms 52 as shown extend a floor portion of the carrier about the tower unit 30. One or more such work platforms 52 may be provided at various positions about the rigging system 100 to provide a surface for the crew. FIG. 16 shows the work platforms 52 in the retracted position to allow the carrier 26 to pull away from the tower unit 30. The work platforms 52 may be retracted by, for example, sliding the work platforms 52 on top of adjacent portions of the carrier 26, or rotating the work platforms to a lower position.

Figure 17B:
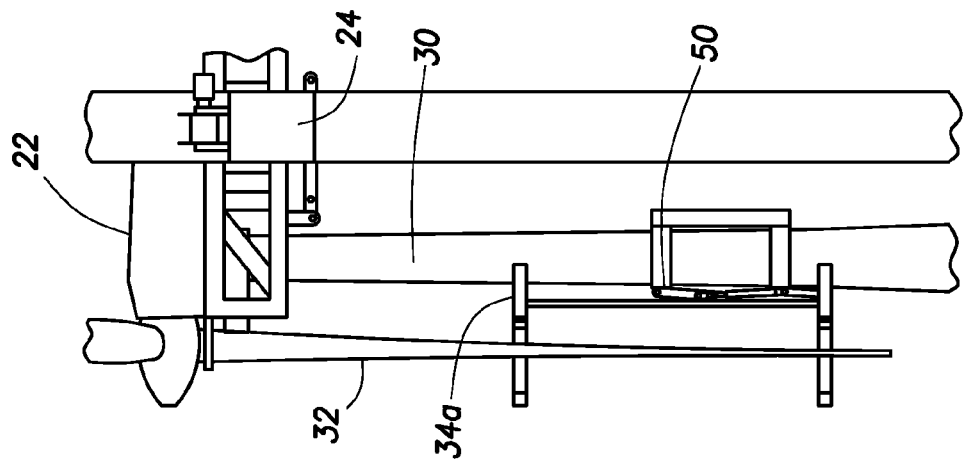
FIG. 17B shows a side view of the rigging system of FIG. 17A.
Figure 17A:
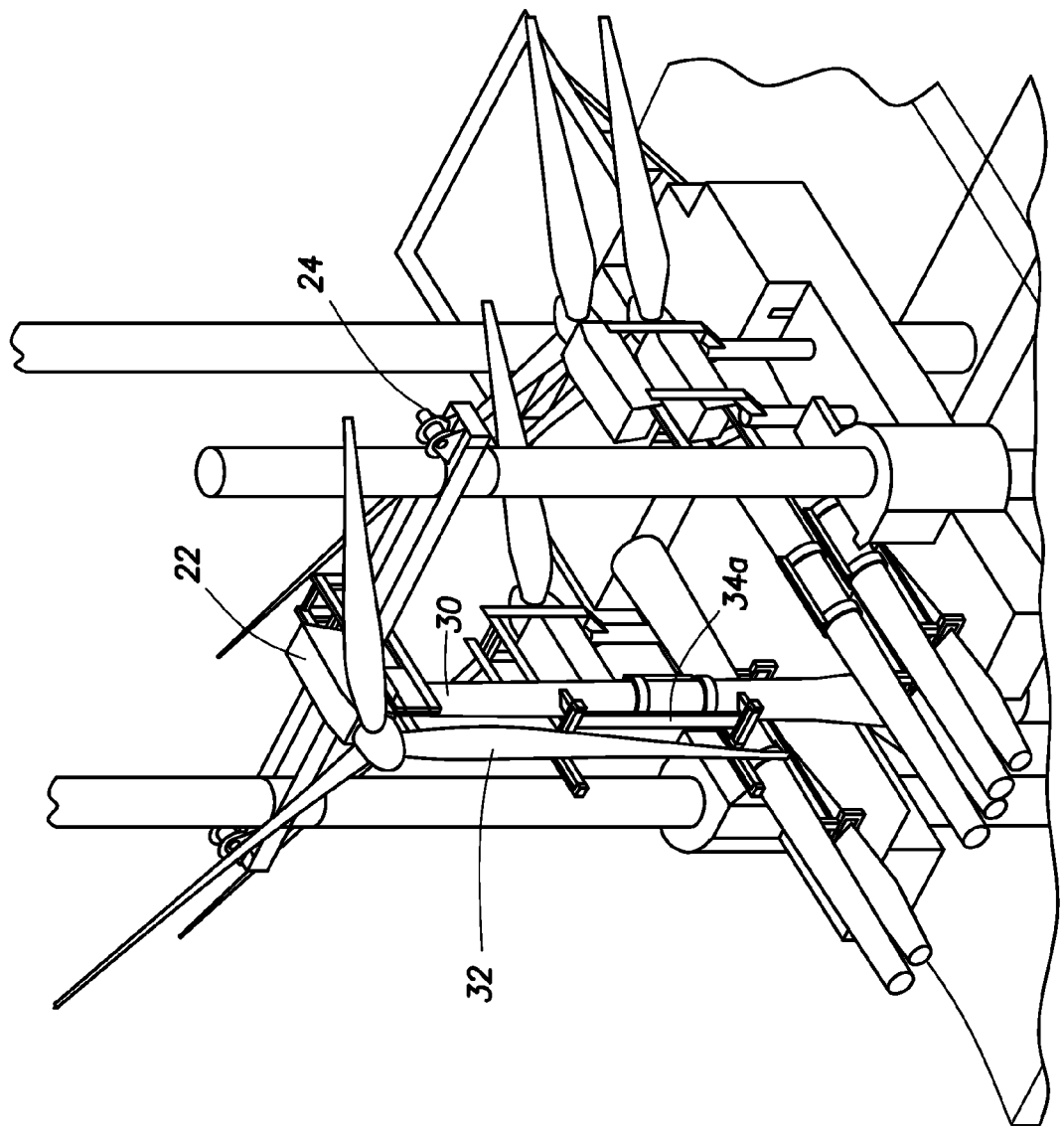
FIG. 17A shows the rigging system of FIG. 14A with a blade saddle of the handler in an open position for releasing a blade therefrom.

Once the nacelle 22 is secured to the tower unit 30 and the final blade 32 is secured to the nacelle 22, the blade saddle 34a is disconnected from the blade 32, as shown in FIGS. 17A and 17B. The blade saddle 34a is preferably configured with hinged latching mechanisms for quick release of the blade 32. Once the blade 32 is released, the telescoping member 50 may be moved from the extended position (FIGS. 14A, 14B) to a collapsed position adjacent the tower unit 30.

Figure 18:
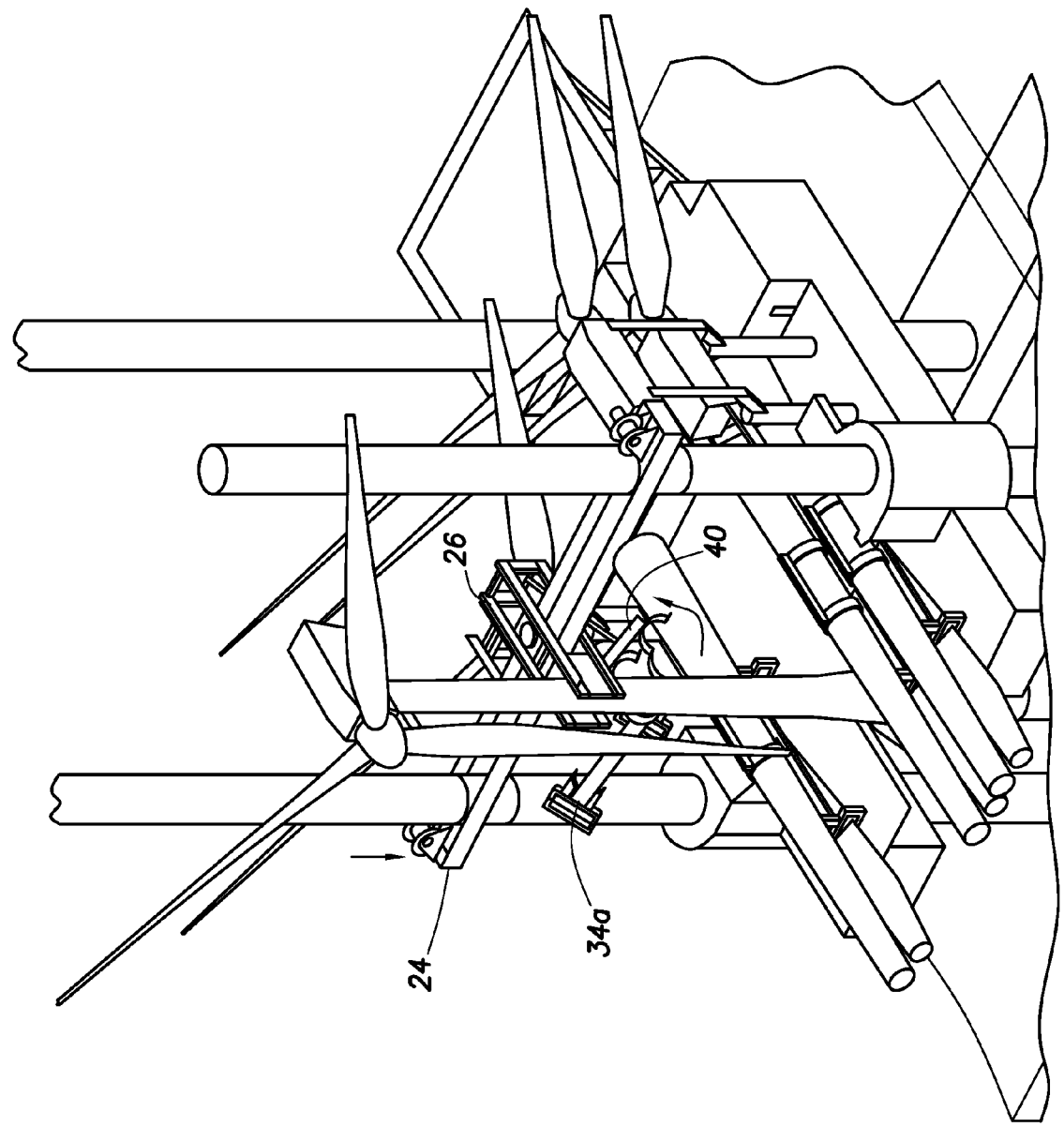

The hoisting platform 24 is then lowered and coupled to the bracing 40 and blade saddle 34a for removal of the bracing 40 and blade saddle 34a from the tower unit 30, as shown in FIG. 18. The hoisting platform 24 may be coupled to the blade saddle 34a using the handling arm in the same manner as previously described with respect to FIGS. 6 and 7.

The carrier 26 and blade saddle 34a are then disconnected from the tower unit 30. The bracing 40 is opened to release the bracing from about the tower unit 30. The handling arm 42 is then moved to the retracted position below the carrier 26, thereby reversing the movement as described with respect to FIGS. 10A and 10B.

Figure 19:
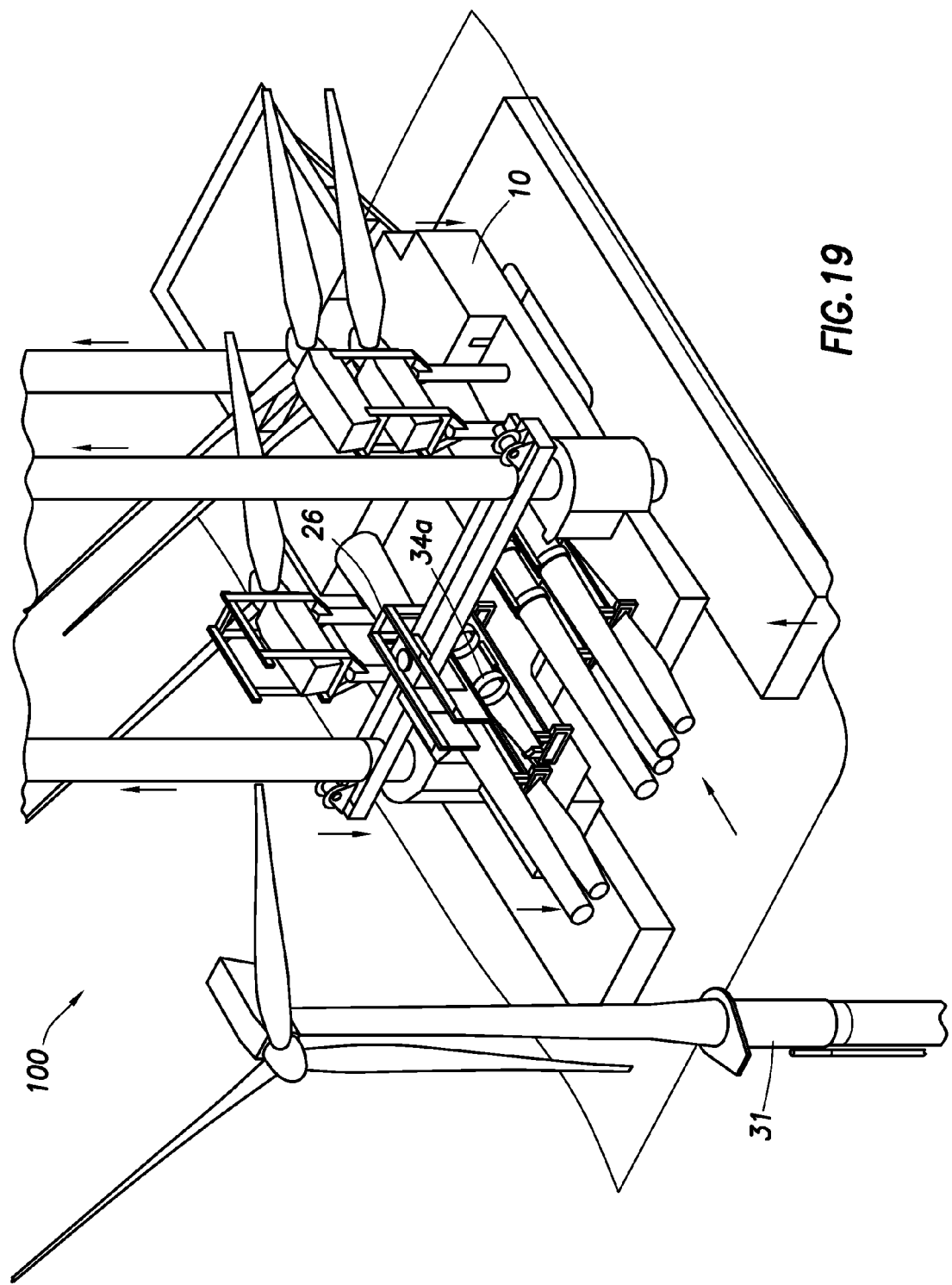
Figure 20:
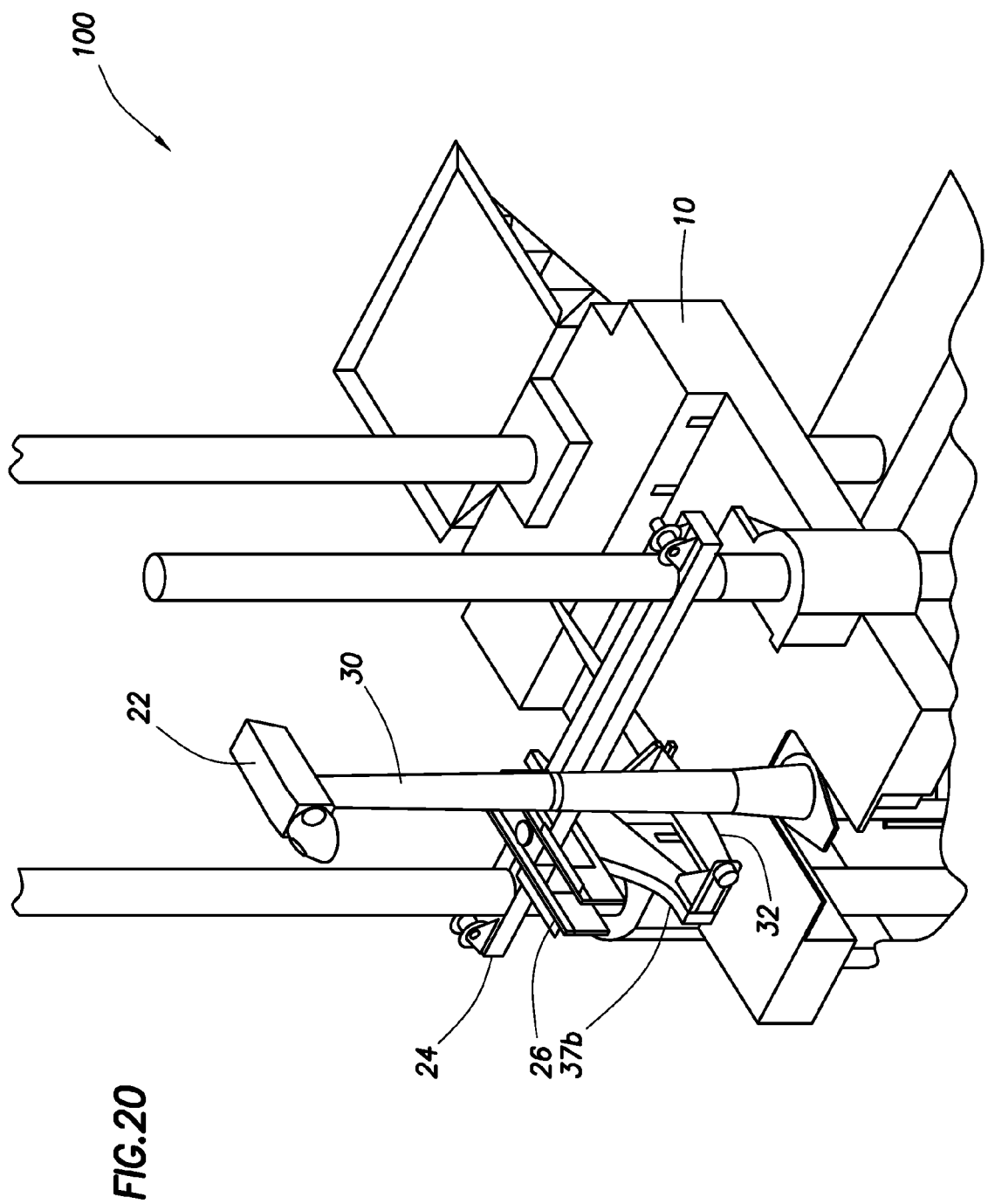

The blade saddle 34a is rotated to a retracted position under the carrier 26 as shown in FIG. 19. The platform legs 14 are then retracted and the unit is lowered or Jacked down, ready for movement to another case. With the platform legs 14 retracted and the base 10 'Jacked down', the installation is complete and the system 100 retreats away from the base tower unit 31. With the wind turbine installed, the rigging system 100 is now en-route to another install site to repeat the process.

FIGS. 20-24 show an alternate handler 37b for use with the rigging system 100. As shown in these figures, the alternate handler 37b is used for storing and installing a blade 32. The handler 37b may be operatively connected to the carrier 26 and moved about the system 100 via the carrier 26 and hoisting platform 24 in the same manner as previously described with respect to the handler 37a and as shown, for example, in FIG. 9. In this version, the handler 37b has an alternate blade saddle 34b operatively connectable to the arm 42 of carrier 26 in the same manner as handler 37a is connected as previously described with respect to FIGS. 6 and 7.

Figure 21C:
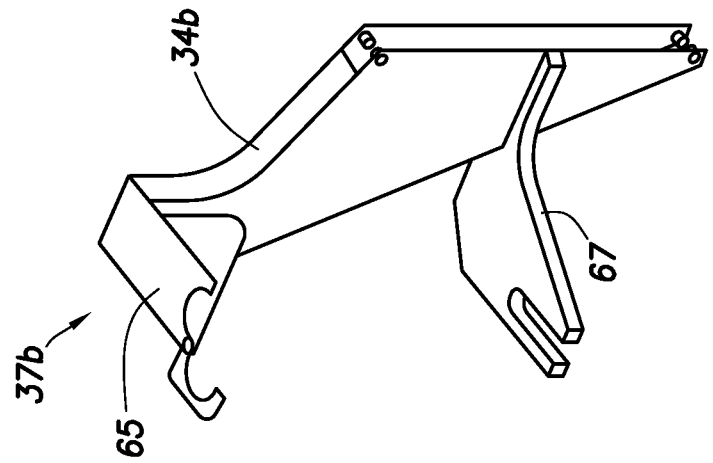
FIGS. 21A-C are detailed views of the alternate handler of FIG. 20.
Figure 21B:
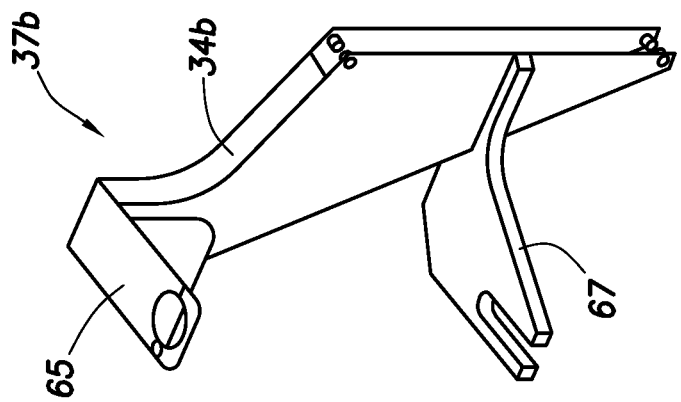
Figure 21A:
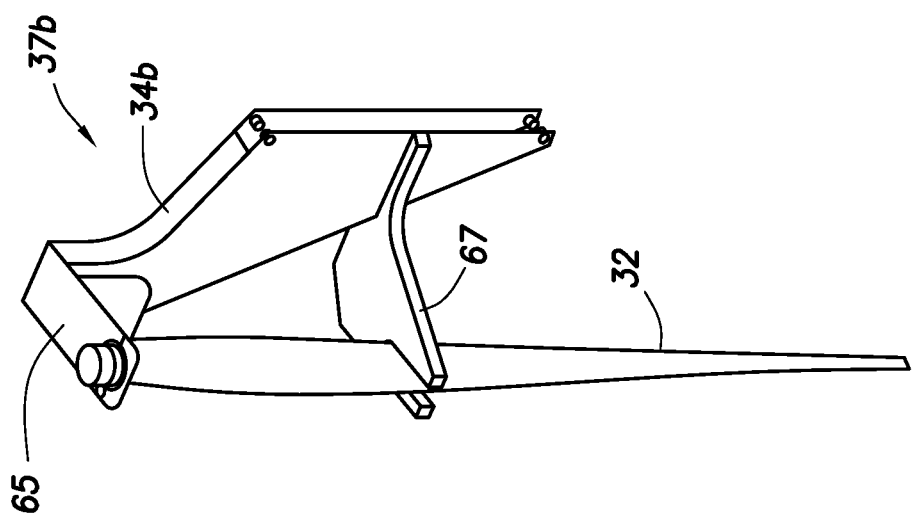

A detailed view of the handler 37b is shown in FIGS. 21A-C. The blade saddle 34b has a bracing with a blade grip 65 on an end thereof for receiving a hub end of the blade 32. The blade saddle 34b also has a blade support 67 a distance from the blade grip 65 for supporting the blade 32 on the blade saddle 34b. The blade support 67 is shown as having an open end for receiving the blade.

FIGS. 21B-C show the handler 37b with the blade 32 removed. These figures depict the operation of the blade grip 65. Preferably, the blade grip 65 may be selectively and hingedly opened to receive and/or release a blade 32. The blade grip 65 is movable between a closed position about the blade 32 as shown in FIGS. 21A and 21B, and an open position as shown in FIG. 21C. Preferably, the blade grip 65 and blade support 67 have surfaces that act as feet positionable on base 10 for storage of the blade thereon.

Figure 23:
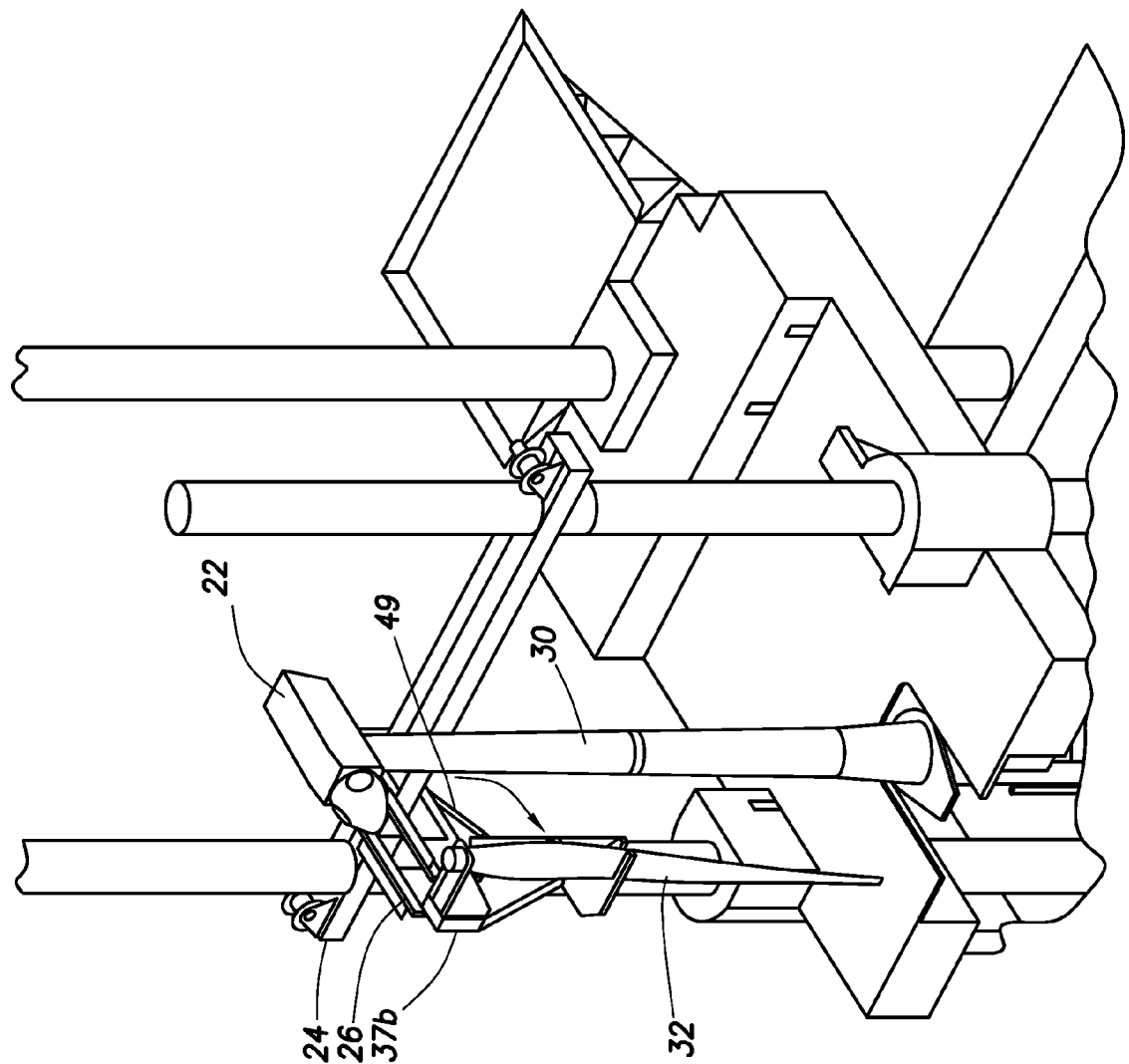
Figure 24:
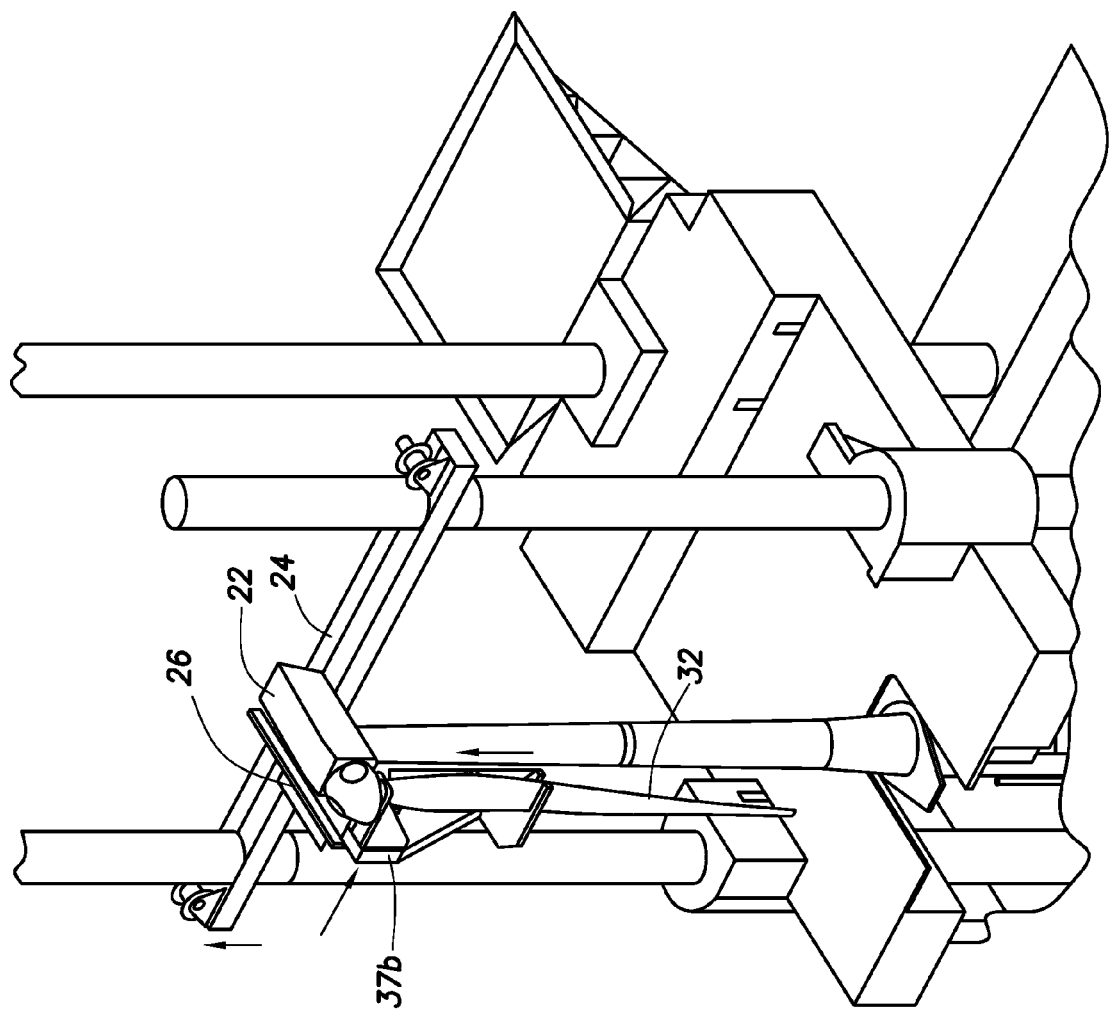

Once a blade 32 is positioned in the handler 37b and attached to the carrier 26, the blade 32 may be transported via the carrier 100 to a position adjacent a nacelle 22 and tower unit 30 for installation thereon as shown in FIGS. 22-24. The tower unit 30 and nacelle 22 may be installed in tower unit 30 as previously described. In this configuration, the nacelle 22 is installed without a blade 32. FIG. 22 shows the carrier 26 raising the handler 37b to a height for installation of the blade. FIG. 23 shows the handler 37b being rotated via extension of arm 42 by piston 49 in the same manner as described with respect to FIGS. 10A and 10B. Once the blade 32 is in the vertical position, carrier 26 is moved along hoisting platform 24 such that blade 32 is placed in horizontal alignment with nacelle 22 for installation as shown in FIG. 24. The nacelle 22 may be rotated, and the process repeated for additional blades.

Figure 25:
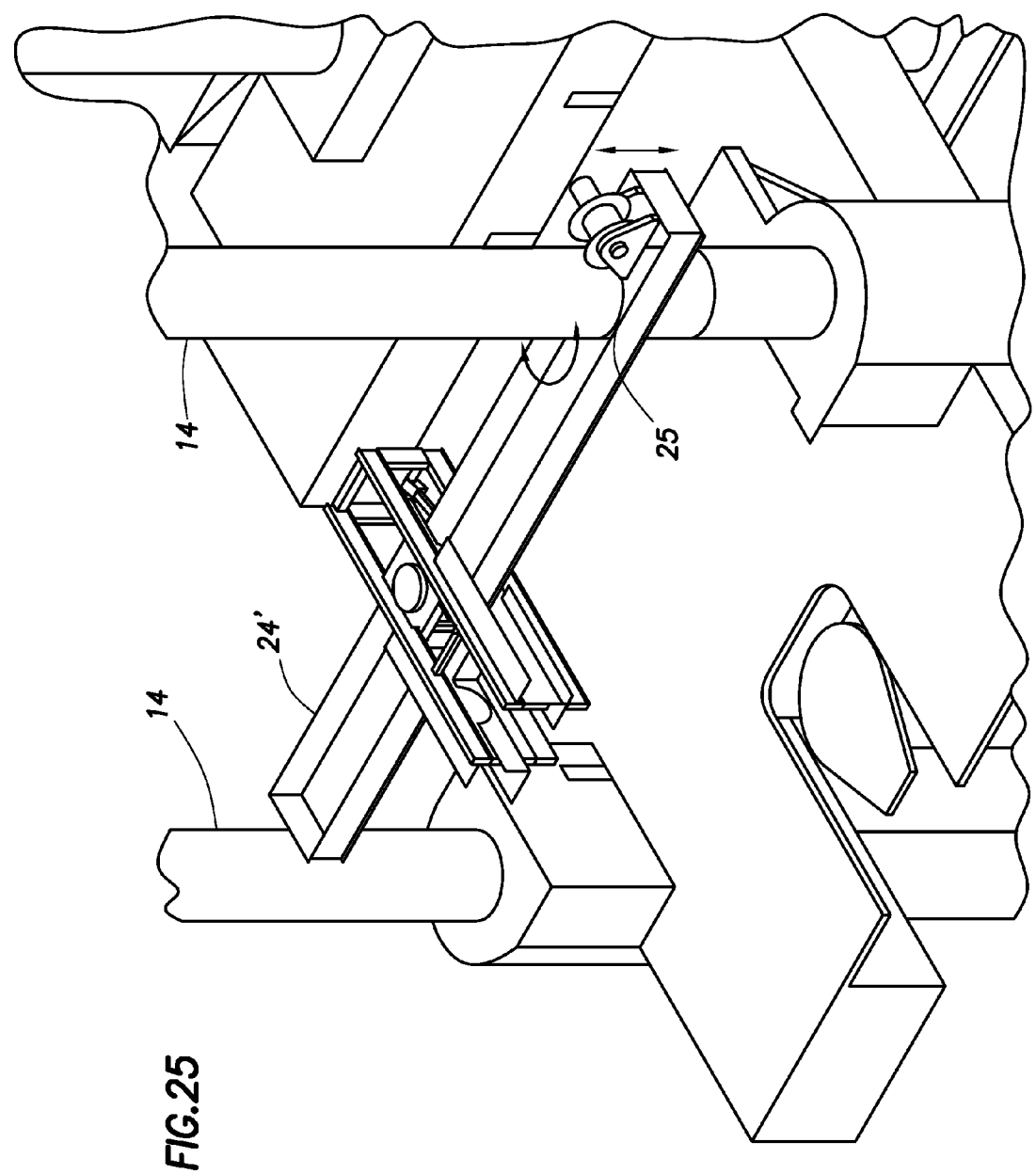
Figure 26:
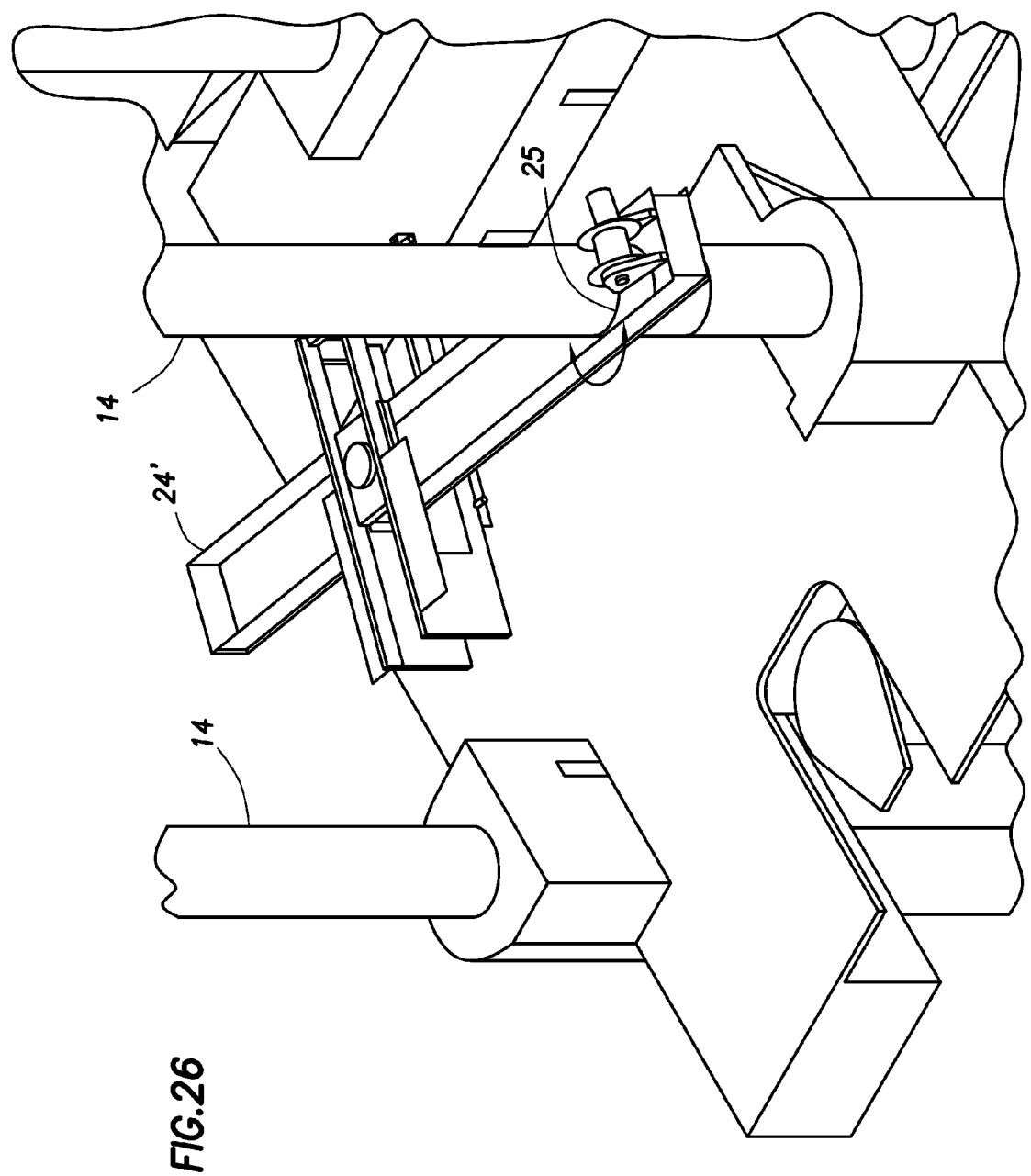

FIG. 25 shows an alternate handling system with an alternate hoisting platform 24' usable with the rigging system 100. The alternate hoisting platform 24' is similar to the hoisting platform 24, except that the hoisting platform 24' has a single hole 25 therethrough for receiving a single platform leg 14. The hoisting platform 24' is configured to run up and down along the platform legs 14, as previously described herein. In this configuration, the hoisting platform 24' is also rotatable about the platform leg 14 as shown in FIG. 26. The hoisting platform 24' is preferably rotatable for transferring and/or transporting windmill components to and from the base and/or an adjacent surface, such as the conveyance system 200 of FIG. 27 (described below).

While the configuration of FIG. 25 shows the hoisting platform 24' with a single hole 25, it will be appreciated that the hoisting platform may be provided with one or more holes positionable about one or more platform legs 14. The hoisting platform 24' may be operatively (e.g., hingedly) connected to one or more platform legs 14 and selectively releasable therefrom such that the hoisting platform 24' may be slidably movable along one or more platform legs 14.

Figure 27:
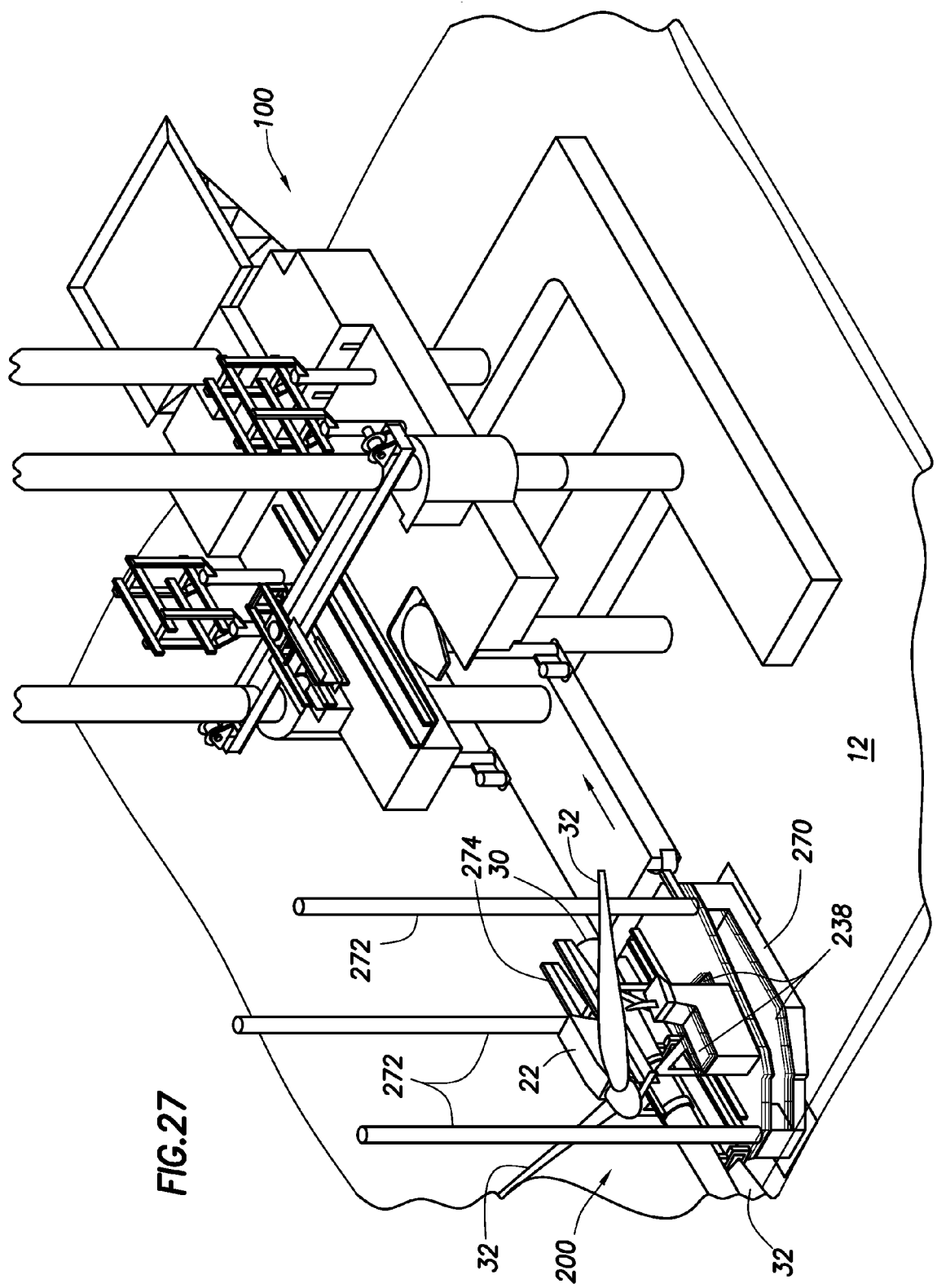

Aspects of the invention also entail a windmill conveyance system 200. FIG. 27 shows an aspect of the system configured for offshore applications. In this figure, the conveyance system 200 moves to a location for delivery of a wind turbine tower assembly. The wind turbine tower assembly delivered by the conveyance system 200 includes a nacelle 22 and a tower unit 30 (with blade 32). The conveyance system 200 advances toward a mobile turbine carrier and rigging system 100 at the location. The rigging system 100 may be the same as the rigging system 100 described previously with respect to FIGS. 1-24, or another facility capable of receiving windmill components, such as nacelle 22 and tower unit 30 of the wind turbine tower assembly.

The conveyance system 200 includes a transporter 270 and a transfer system 274. As depicted in FIG. 27, the transporter 270 is a lift boat suspended in the sea 12 for transporting the tower unit 30 and a nacelle 22 to the rigging system 100. The lift boat has a top surface for supporting the transfer system 274. Various railings/ladders/walkways 238 may be disposed on the lift boat 270 to provide and facilitate safe crew access and movement. The lift boat 270 includes three extendable uprights or boat legs 272. Some aspects may be implemented with more or less than three legs, depending on the layout and configuration of the lift boat 270. The lift boat 270 is configured to remain afloat while the boat legs 272 are suspended off the sea floor.

Figure 28A:
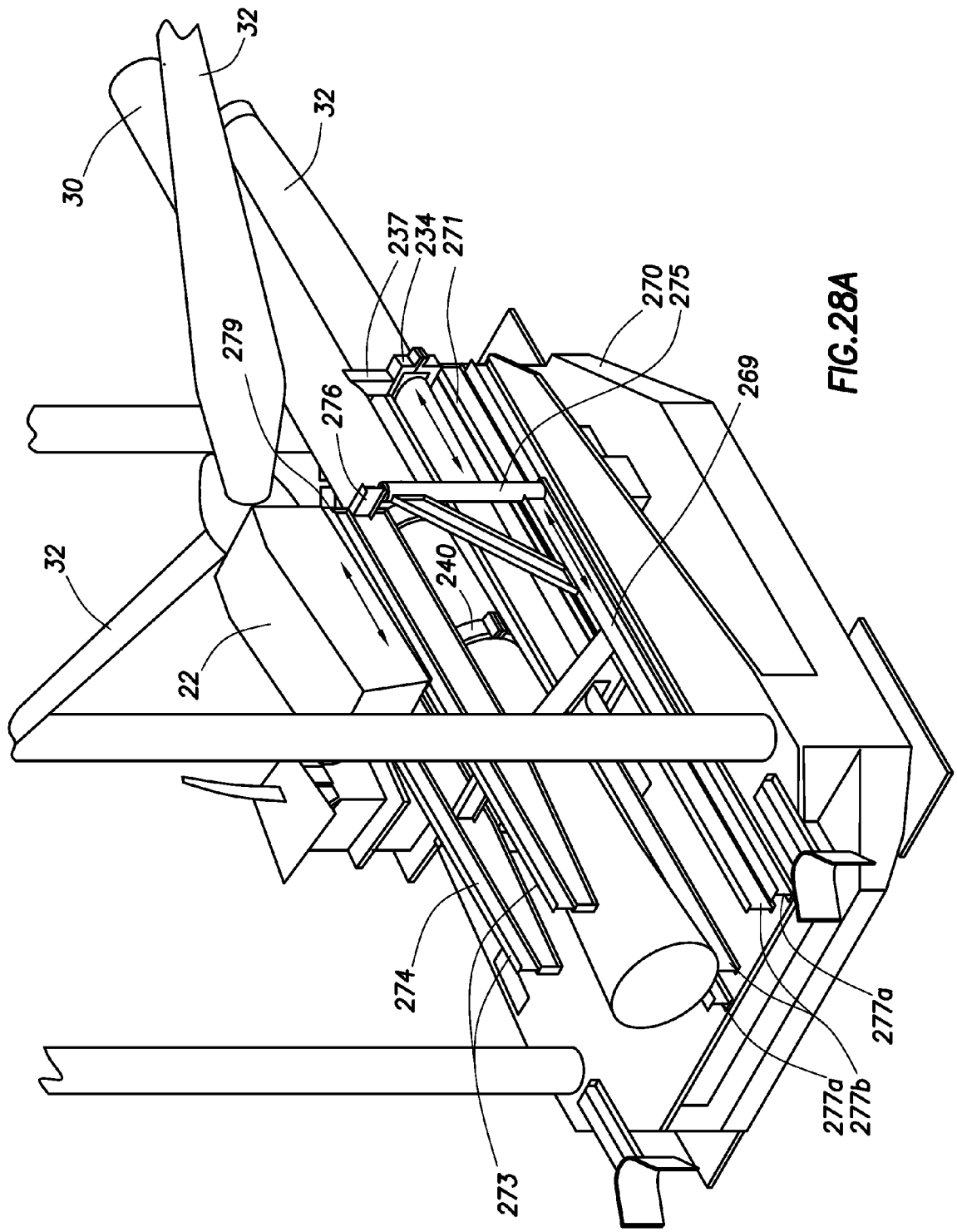
FIGS. 28A,B,C are detailed views of the conveyance system of FIG. 27.
Figure 28B:
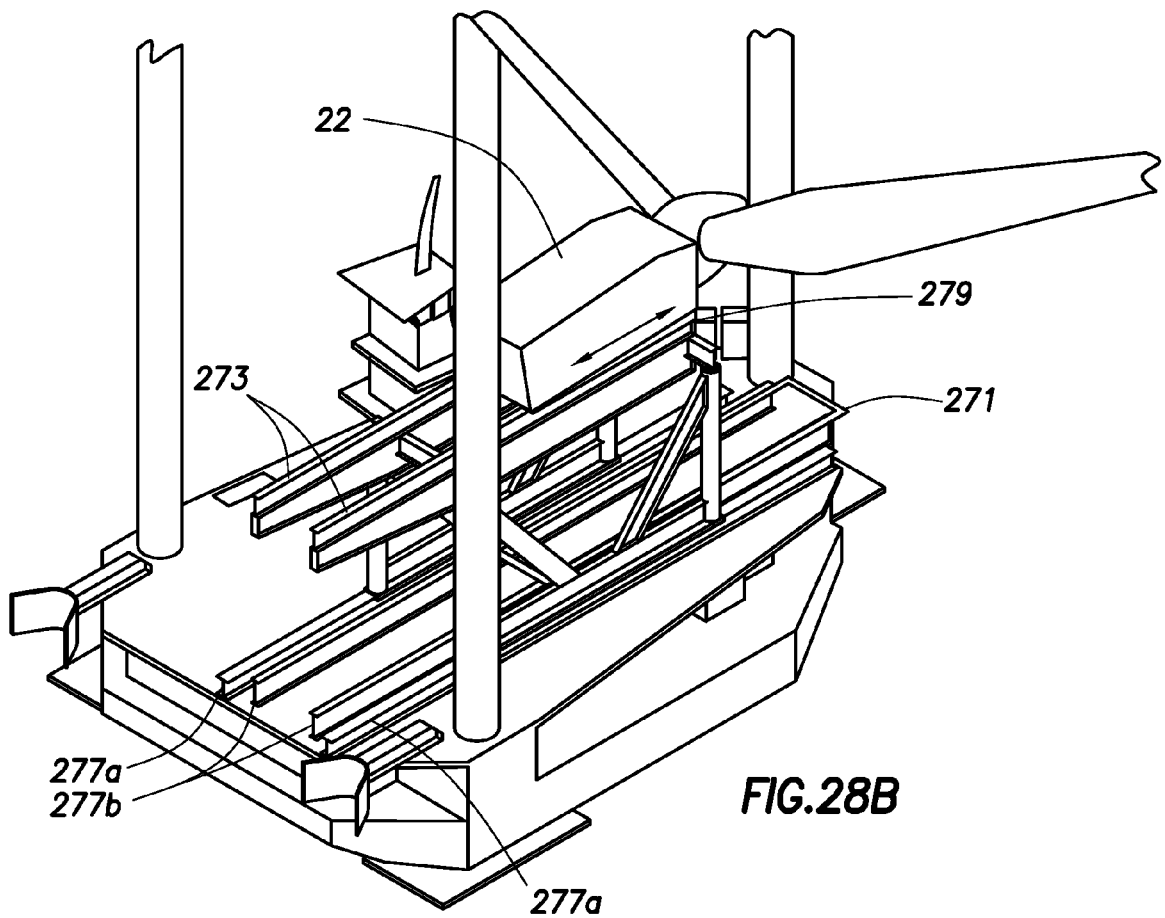
FIG. 28B shows the transfer system of FIG. 28A with the tower unit removed.
Figure 28C:
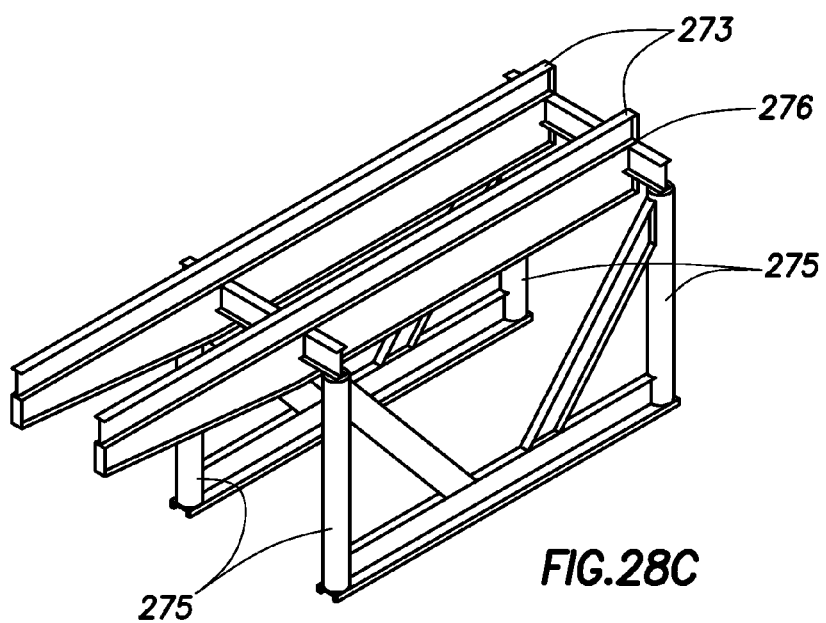
FIG. 28C shows an upper support of the transfer system.

The transfer system 274 is depicted in FIG. 28A as a transfer platform 274 positioned on the lift boat 270 for transferring tower unit 30 (with blade 32) and a nacelle 22 onto the rigging system 100. The transfer system 274 is depicted in greater detail in FIGS. 28A-C. FIG. 28A shows the transfer system 274 with a nacelle 22 and tower unit 30 (with blade 32) supported thereby. The transfer platform 274 includes an upper support 276 with support legs 275 extending therefrom. FIG. 28B shows the transfer platform 274 of FIG. 28A with the tower unit 30 (and blade 32) removed. FIG. 28C shows an upper support 276 of the transfer platform.

The upper support 276 is configured to cradle a conventional wind turbine nacelle 22. The upper support 276 has upper rails 273 for slidably moving the nacelle 22 along the upper support 276. Slider 279 is provided for supporting the nacelle 22 on the rails 273 and for facilitating slidable movement of the nacelle along the rails 273. The slider 279 may be the same as slider 41 for slidably moving nacelle 22 as previously described. The support legs 275 of upper support 276 are operatively connected to lower rails 277a for slidably moving the upper support 276 along a surface of the lift boat 270.

A tower unit 30 is positioned on a lower support 269 below the upper support 276. The lower support 269 includes bracing 240 for securing each tower unit in place on the lower support 269. The bracing 240 may be the same as the bracing 40a described previously for supporting a tower unit 30 and blade 32. The lower support 269 is slidably movable along lower rails 277b for transferring the tower unit 30. Lower support 269 may be, for example, a slider similar to slider 41 for supporting the tower unit 30 on the rails 277b and for facilitating slidable movement of the tower unit along the rails 277b. Various devices, such as sliders, skid pads, cylinders, bearings, rollers or other devices may be used for slidable movement along the rails 273, 277a,b.

Each tower unit 30 has a single blade 32 therewith held in place by a handler 237, with bracing 240 and a brace or blade saddle 234. The handler 237 and blade saddle 234 may be the same as the handler 37a and blade saddle 34a described above. This particular aspect of the invention is shown with each nacelle 22 outfitted with a pair of blades 32. Some aspects may be implemented with each tower unit 30 equipped with multiple handlers 237, blade saddles 234 and/or blades 32. Other aspects may also be implemented with blade saddles 234 configured to hold multiple blades 32.

While FIGS. 27 and 28A show one nacelle 22 and one tower unit 30 with one blade 32 carried by the lift boat 270 and supported by the transfer platform 274, it will be appreciated that one or more nacelles 22, blades 32, tower units 30 and/or other items may be carried by the lift boat 270, supported by the transfer platform 274, and/or transferred by the transfer platform 274.

Figure 29:
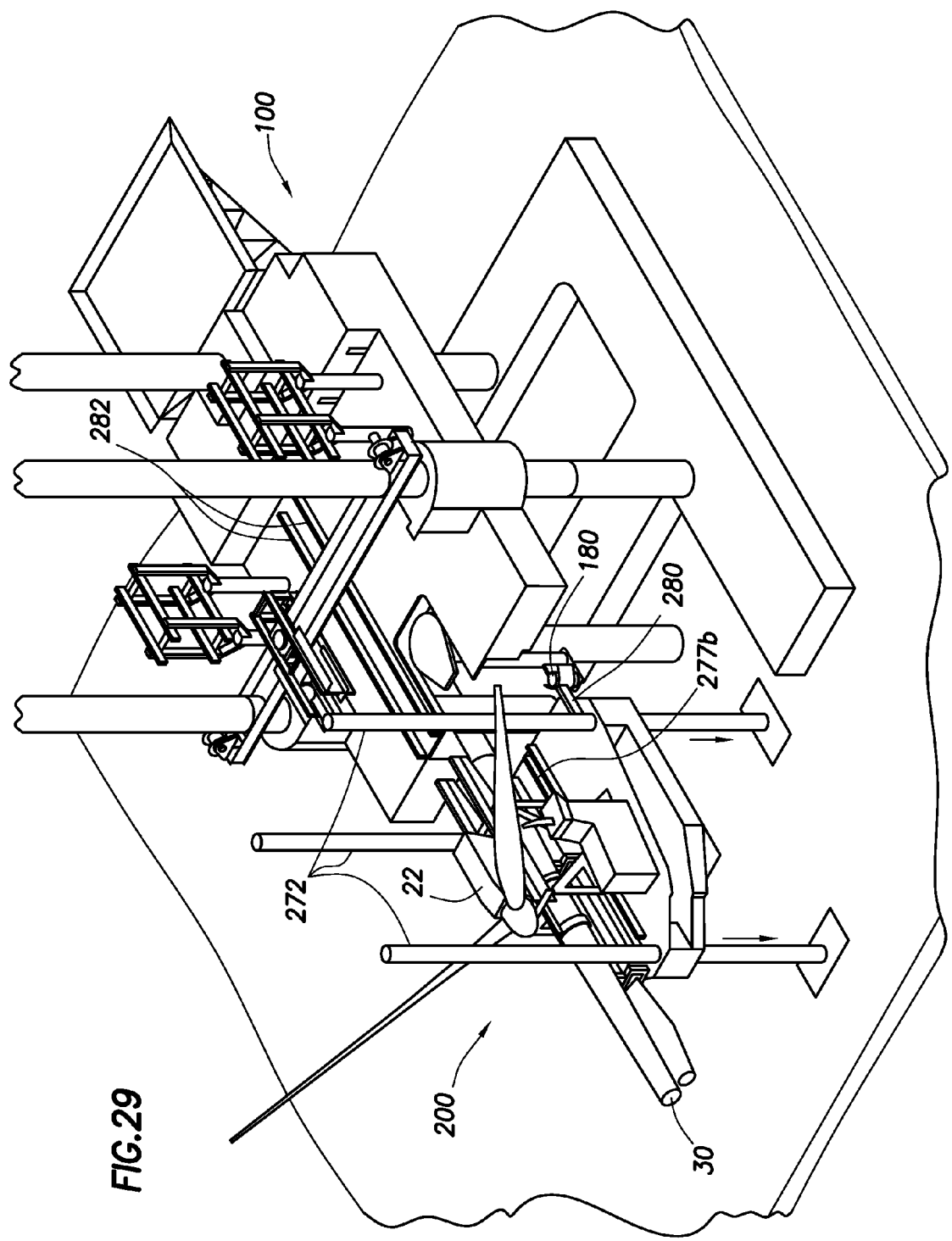

FIG. 29 shows the conveyance system 200 after it reaches the rigging system 100. The lift boat 270 has docking arms 280 for receiving docking grips 180 on the rigging system 100. The lift boat 270 is shown in a docked position adjacent the rigging system 100. The docking arms 280 mate with the docking grips 180 for securing the lift boat 270 to the rigging system 100. It will be appreciated by one of skill in the art that the lift boat 270 may be secured in place by other means, such as rope. Preferably, the lift boat 270 is secured in an aligned position with the rigging system 100 for facilitating transfer of the nacelle 22 and tower unit 30 onto the rigging system 100.

With continuing reference to FIG. 29, once the lift boat 270 is in position, the boat legs 272 are extended to the sea floor to secure the lift boat 270 in position. The boat legs 272 are then used to raise or Jackup the lift boat 270 to the desired height for transfer. Preferably, the lift boat 270 is positioned such that lower rails 277b of the transfer platform 274 are in alignment with base rails 282 on the base 10 of the rigging system 100. The rigging system 100 may be provided with base rails 282 shown in FIG. 29, or other devices capable of facilitating transfer of the wind tower assembly. Winches, cranes or other mechanisms may also be provided about other positions the lift boat 270 and/or rigging system 100 for performing various operations, such as transfers.

Figure 30:
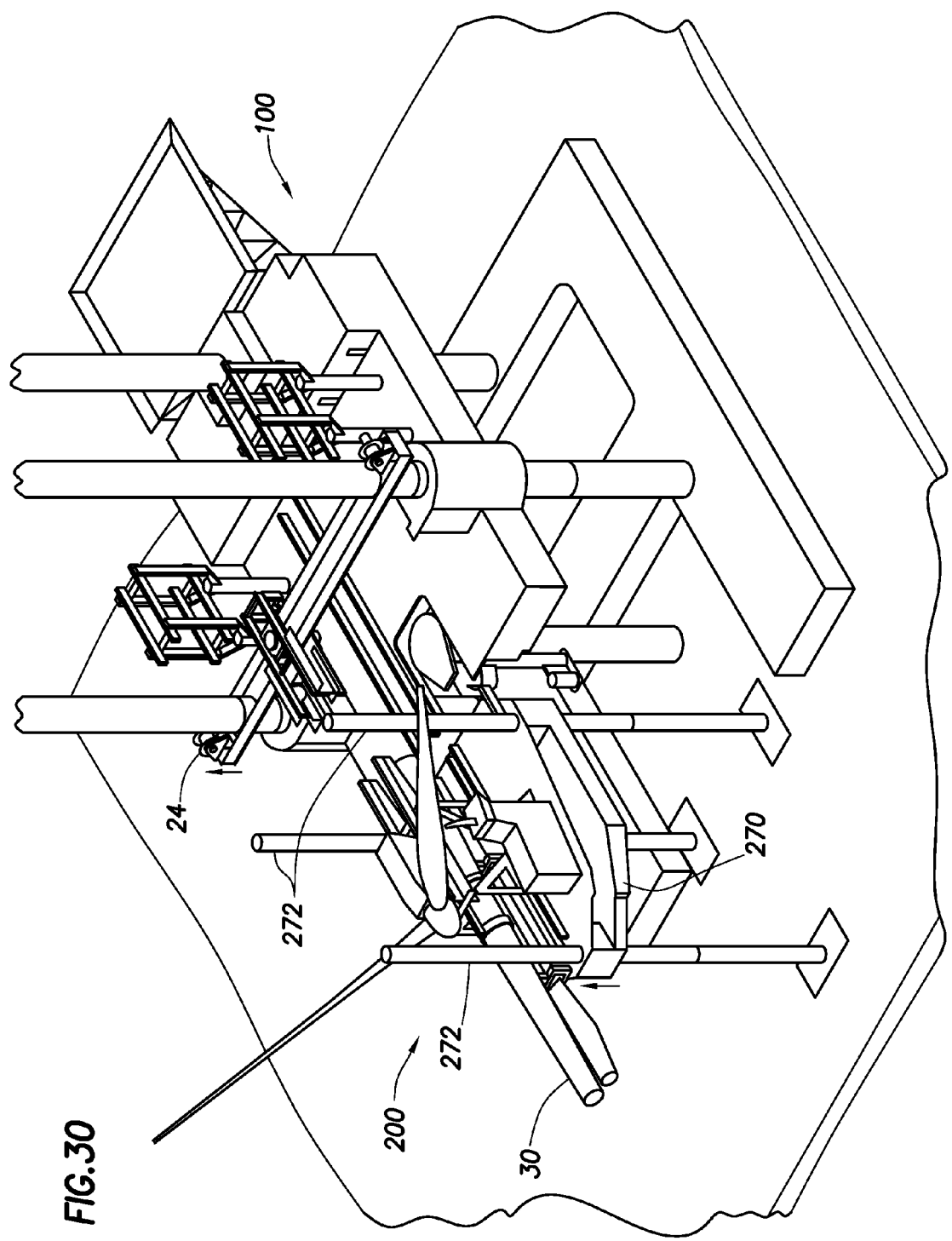

FIG. 30 shows the lift boat 270 raised via boat legs 272 to a height for transfer of the tower unit 30. With the conveyance system 200 in place adjacent the rigging system 100, the hoisting platform 24 may be positioned to permit receipt of the tower unit 30 from the lift boat 270. As shown in FIG. 30, the hoisting platform 24 is raised to a position to enable transfer of the tower unit 30.

Figure 31:
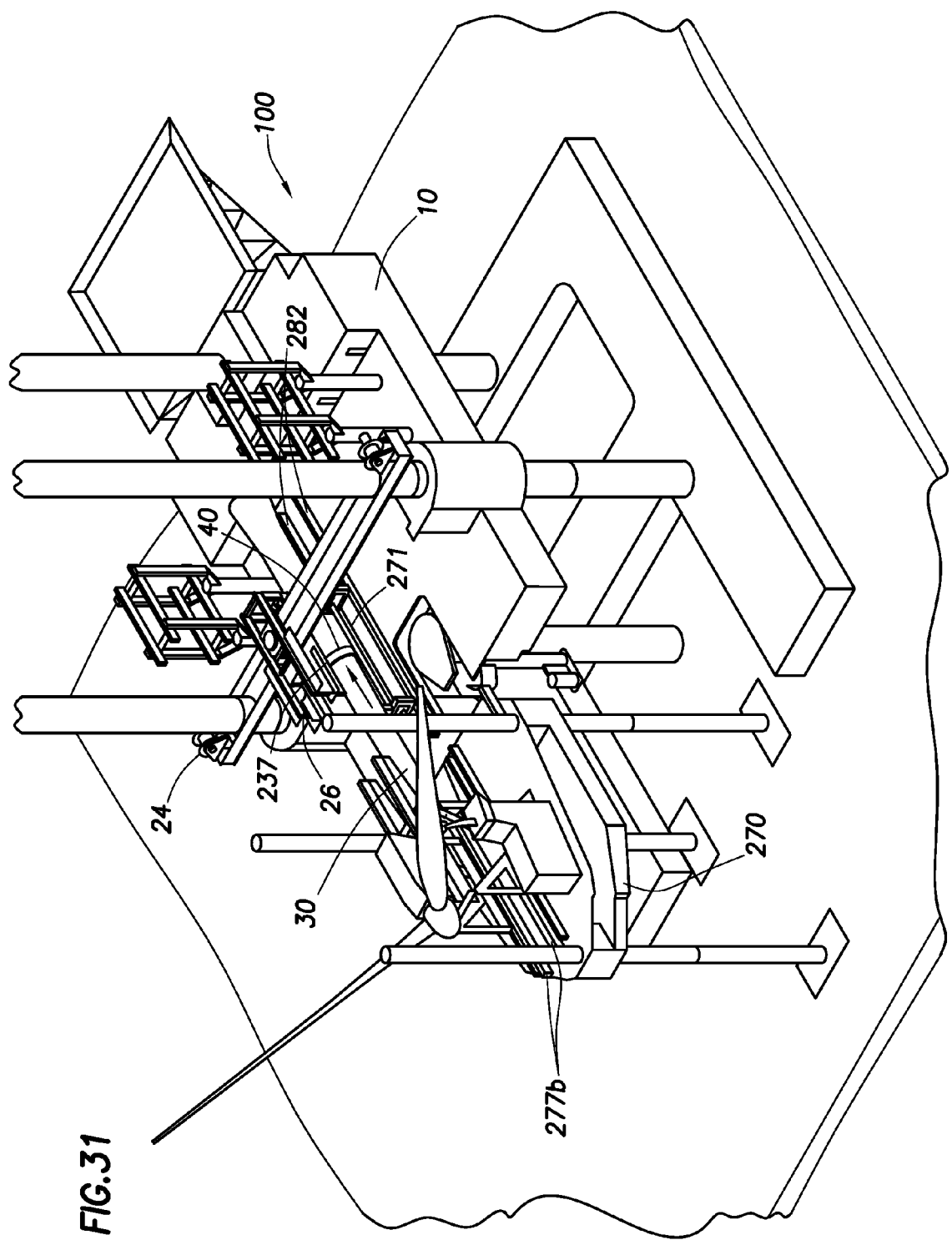

As shown in FIG. 31, tower unit 30 is slidably moved along the lower rails 277b from the lift boat 270 and onto the base rails 282 of the base 10. A slider 271 is depicted as passing along lower rails 277b to base rails 282 for carrying the tower unit 30 from the lift boat 270 to the base 10. Other means, such as a winch, rollers, etc., may be used to facilitate transfer of the tower unit 30 along the rails 277b, 282. The tower unit 30 is received by the carrier 26. The carrier 26 may be coupled to the handler 237 of the tower unit 30 via bracing 40 as previously described.

Figure 32:
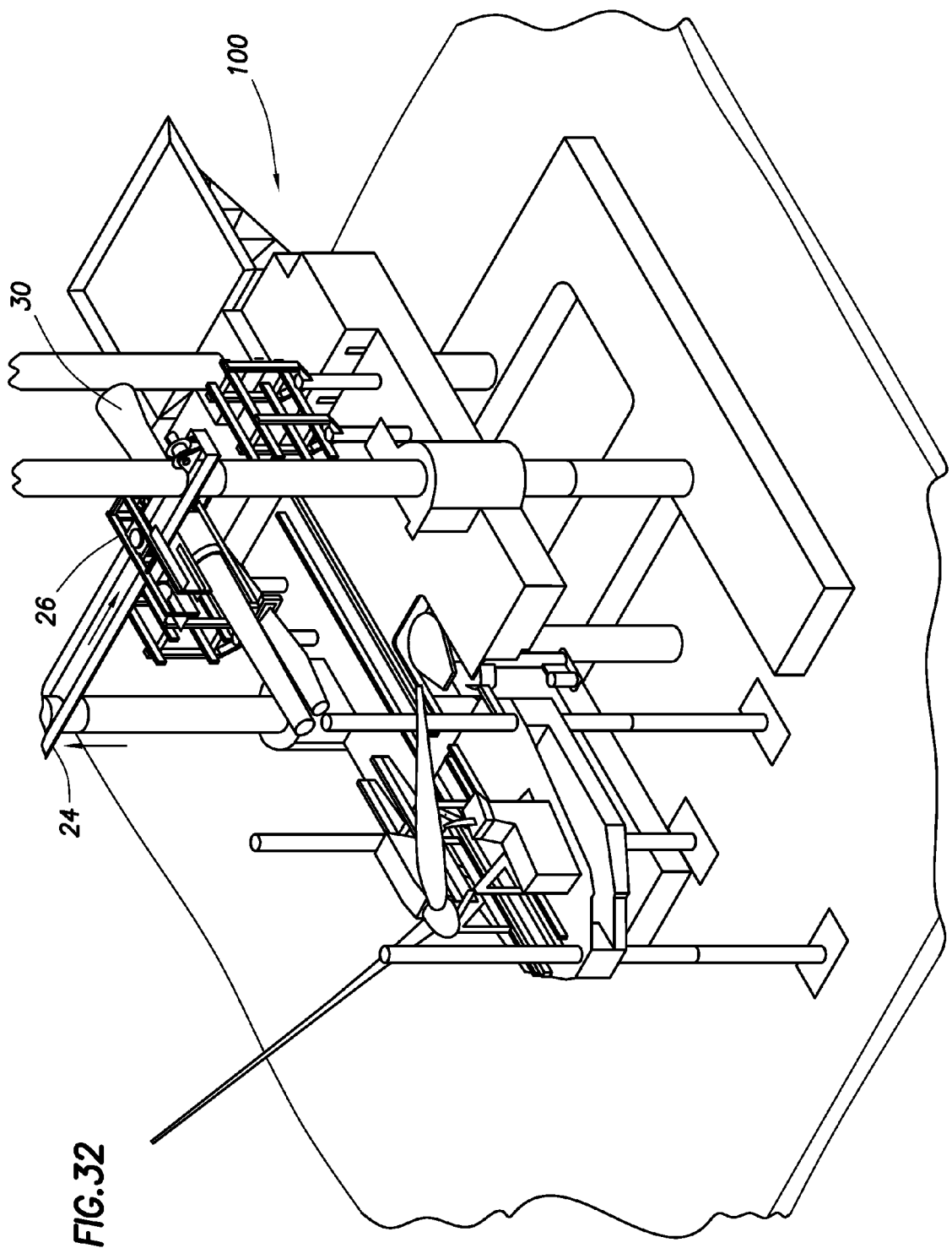

The tower unit 30 may then be transported about the rigging system 100 by the carrier 26 using the hoisting platform 24. As shown in FIG. 32, the hoisting platform 24 moves the tower unit 30 about the rigging system 100. The hoisting platform 24 may be raised and lowered and/or the carrier 26 moved back and forth to move the tower unit 30 as desired.

Figure 33:
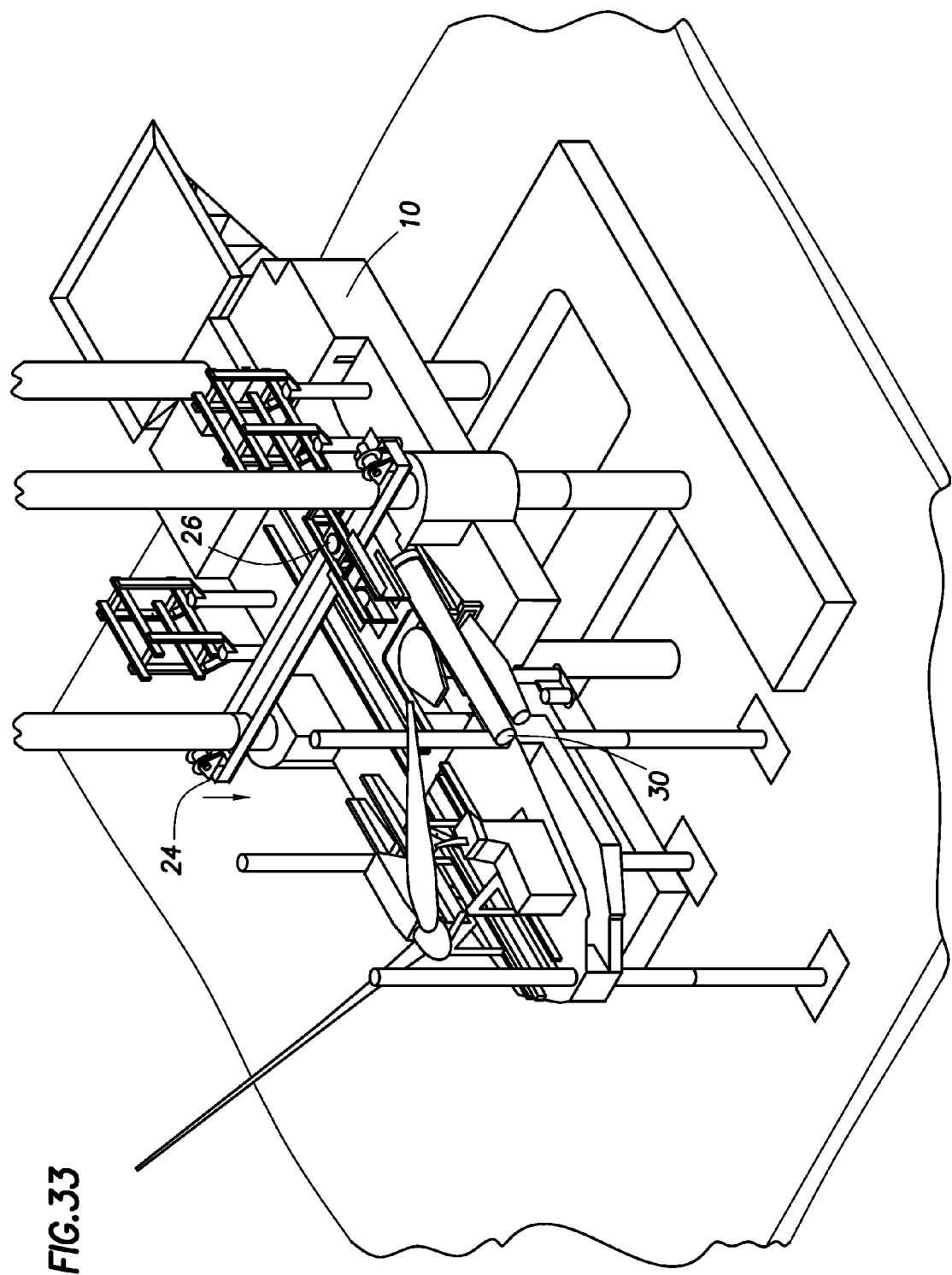

The tower unit may be moved to a location near the base 10. The tower unit 30 is then released onto the base 10 as shown in FIG. 33. The tower unit 30 may be uncoupled from the carrier 26 as previously described. In some cases, the tower units 30 may be transferred to a storage or other location as desired.

Figure 34:
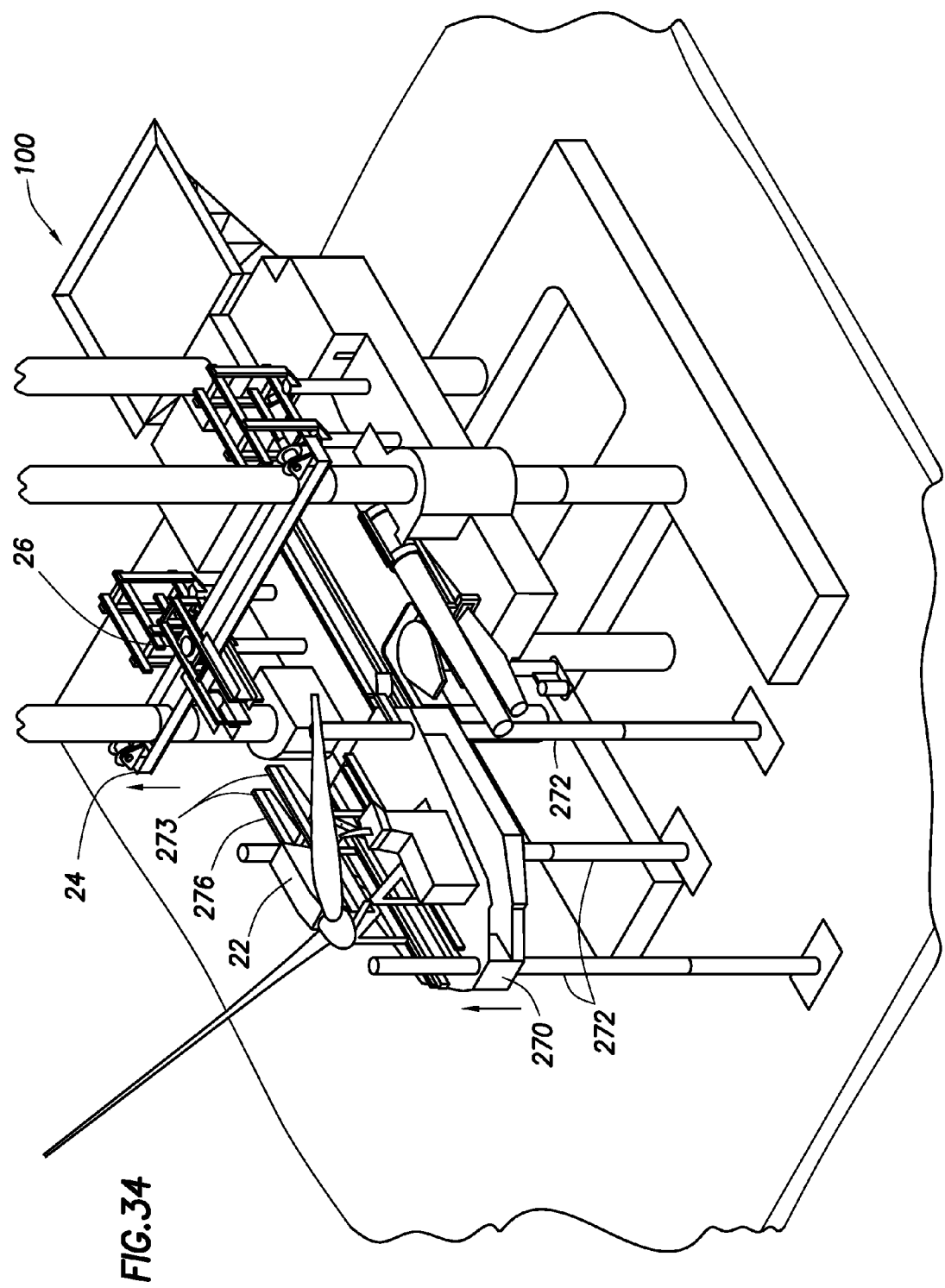

The hoisting platform 24 and lift boat 270 may now be positioned for transfer of the nacelle 22 to the rigging system 100. As shown in FIG. 34, the carrier 26 of the hoisting platform 24 is moved into position for alignment with the upper rails 273 of the upper support 276. The lift boat 270 is then lifted along boat legs 272 to a raised vertical position for transfer as also shown in FIG. 34. The carrier 26 of the hoisting platform 24 is then moved into alignment with the upper support 276 for receipt of the nacelle 22.

Figure 35:
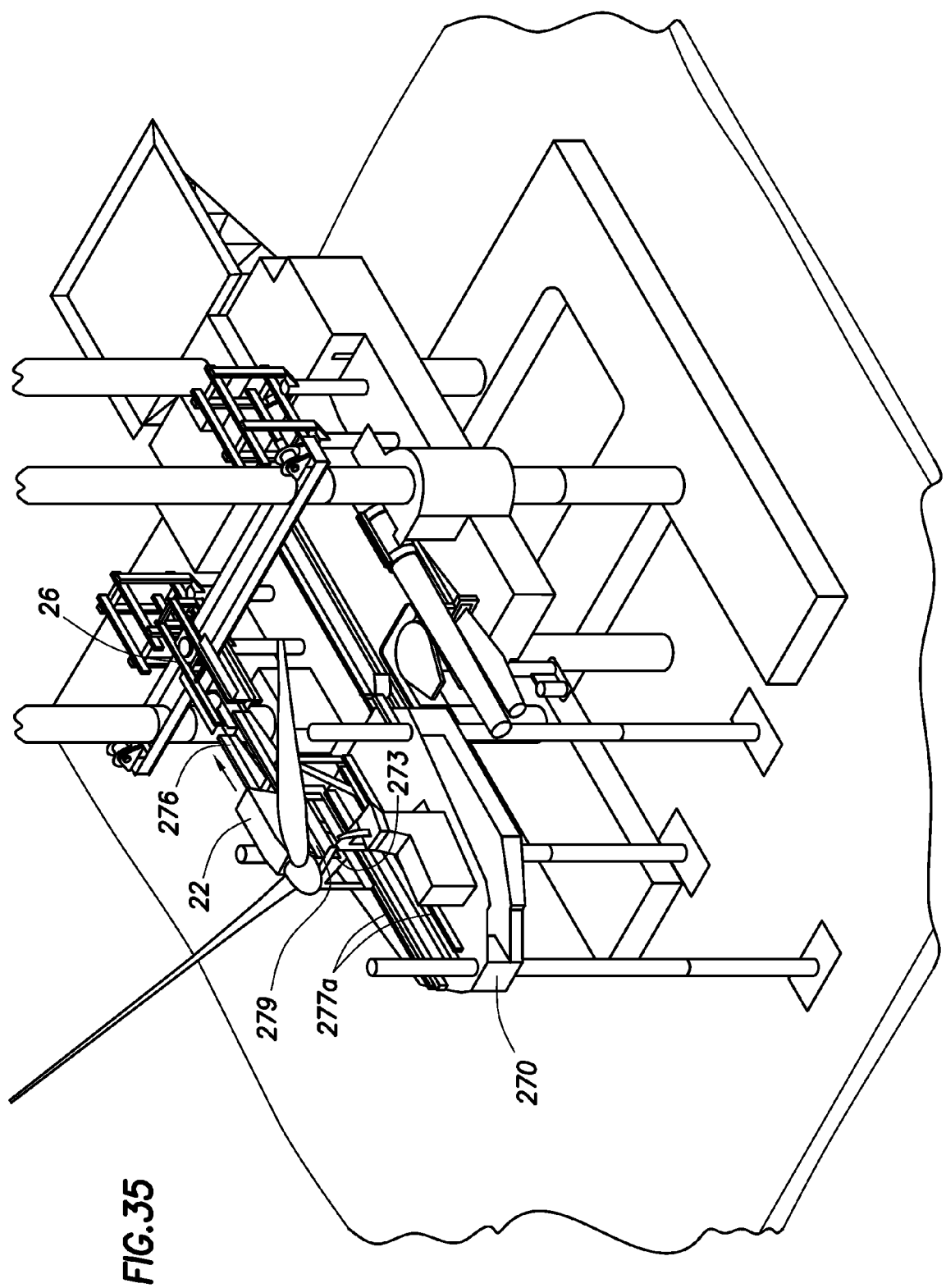

The upper support 276 then moves to an extended position such that upper rails 273 are adjacent the carrier 26 of hoisting platform 24 as shown in FIG. 35. The nacelle 22 is slidably moved by upper support 276 along lower rails 277a of the lift boat 270 and to the carrier 26 as shown in FIG. 35. A slider 279 is provided for carrying the nacelle along rails 273 to the carrier 26.

Figure 36:
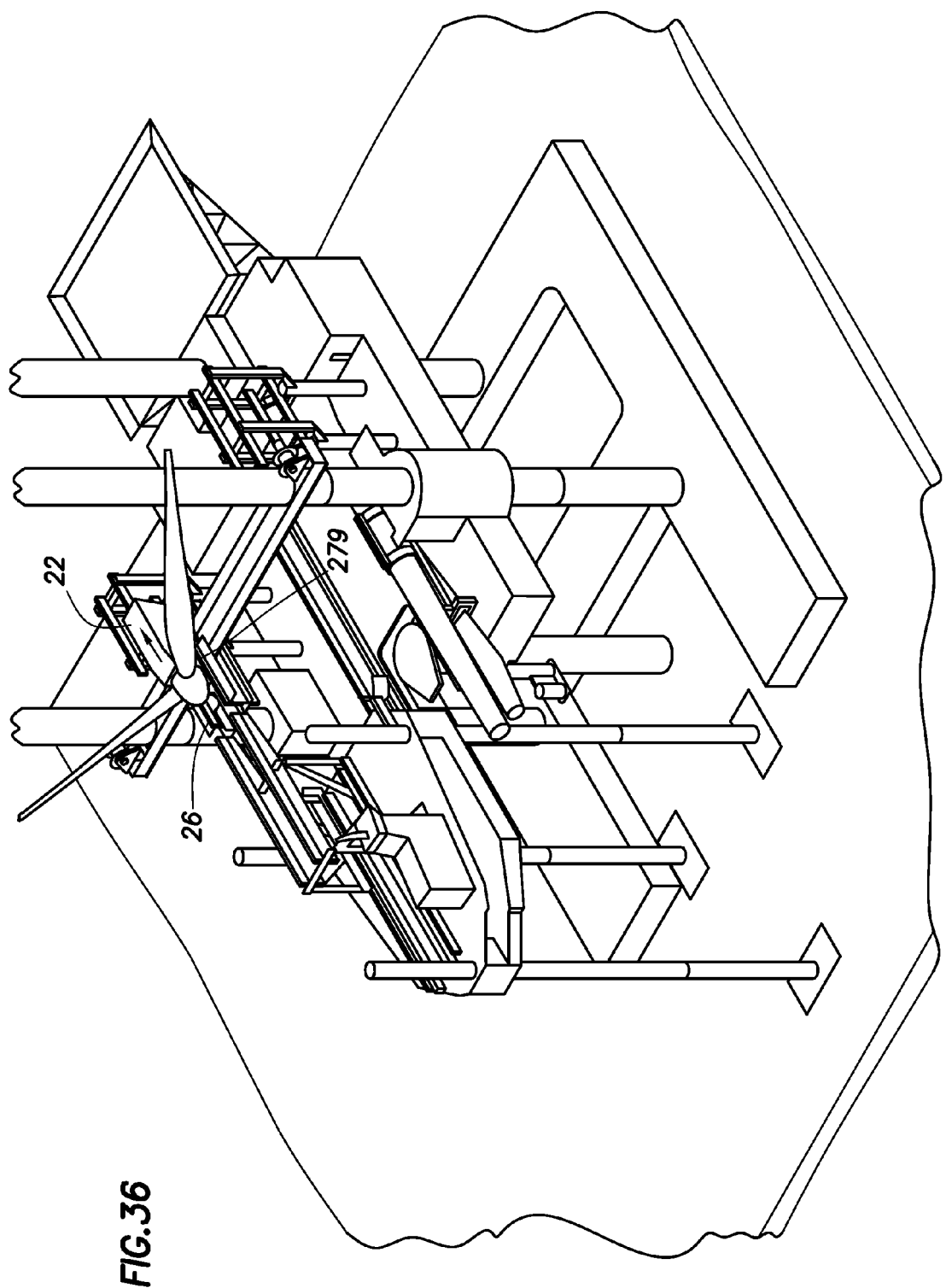

FIG. 36 shows the nacelle 22 as it is received by the carrier 26. The carrier 26 may be adapted for receiving the slider 279. Alternatively, the nacelle 22 may be transferred to the carrier without the slider 279. The nacelle 22 and/or tower unit 30 may be moved onto the rigging system 100 using any suitable means (e.g., via a winch mounted on the upper and/or lower supports 276, 269). In some aspects of the invention, the supports 276, 269 and/or rigging system 100 may be configured with conventional gear/track systems to allow for movement or extension of the components to facilitate the transfers.

Figure 37:
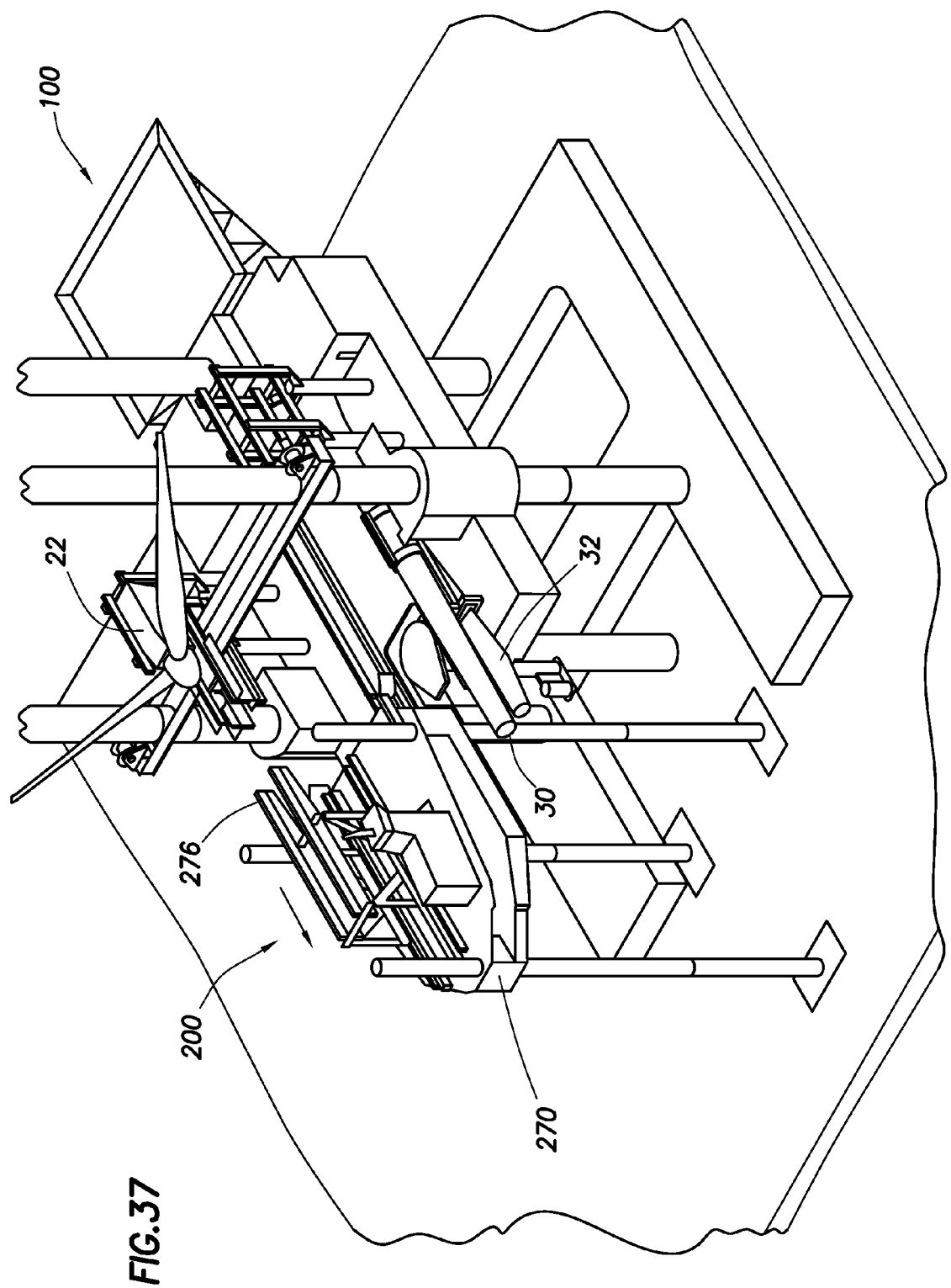

Once that the transfer is complete, the conveyance system 200 may be retracted from the rigging system 100. The upper support 276 is moved back to its original, retracted position on lift boat 270 as shown in FIG. 37. The conveyance process may be repeated such that one or more nacelles 22, tower units 30, blades 32 and/or other components or devices may be transferred by the conveyance system 200 to and/or from the rigging system 100. In some cases, it may be desirable to remove items from the rigging system 100 to the lift boat 270. The conveyance process may be reversed to provide for such removal.

Figure 38:
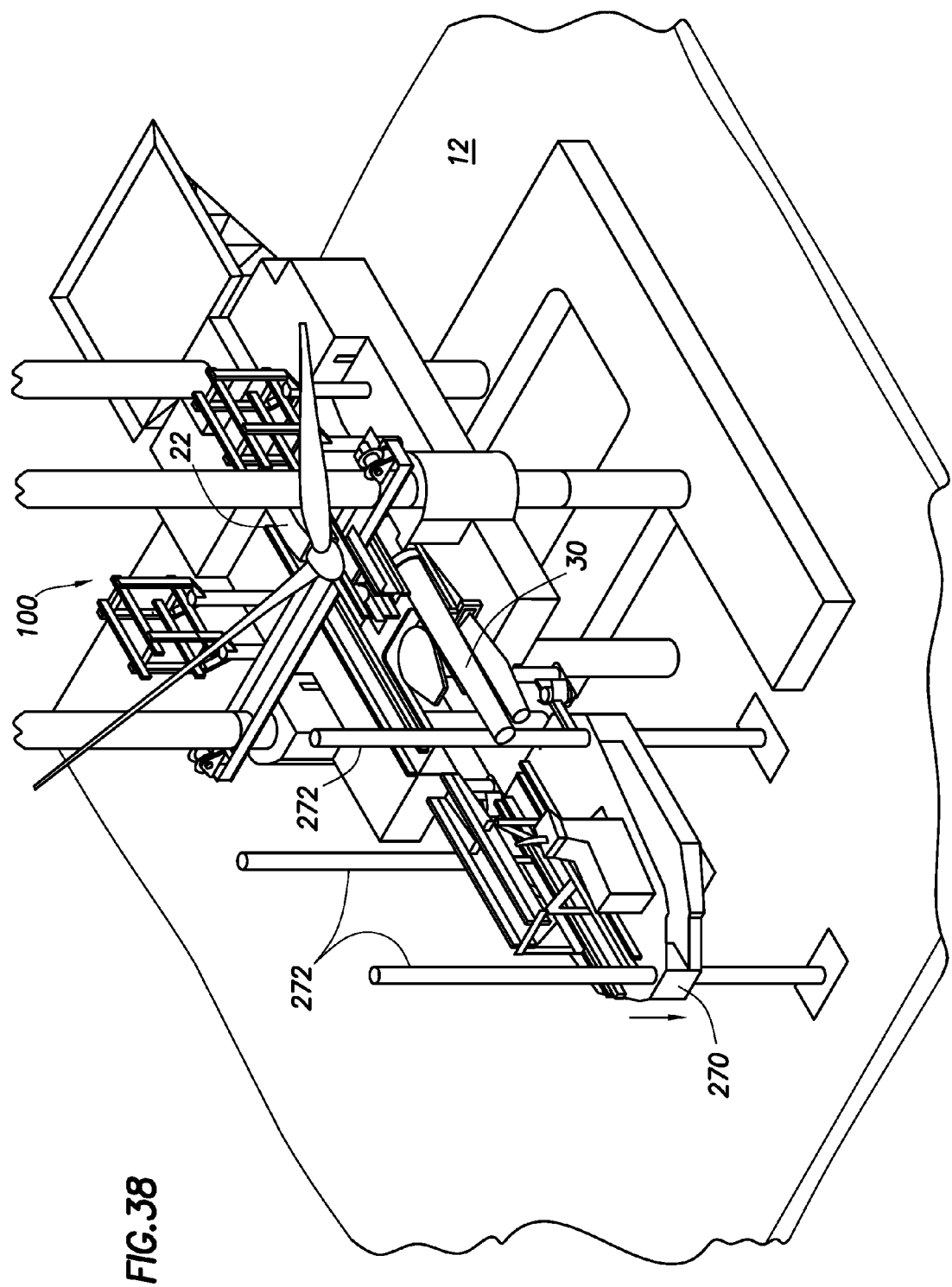

Lift boat 270 is lowered along boat legs 272 to sea level 12 as shown in FIG. 38. The boat legs 272 may then be lifted to their original position as shown previously. The transferred nacelle(s) 22, tower unit(s) 30 and/or blade(s) 32 may be positioned about the rigging system 100 as desired as described previously. Components may be transferred and/or stored using handlers 37a, 37b, 237a and/or other devices. One or more nacelles 22, tower units 30 and/or blades 32 may be transported together or separately about the rigging system 100. The nacelles 22, tower units 30 and/or blades may then be stored and/or installed as described previously herein.

It will be appreciated by those skilled in the art that the hoist and/or delivery systems/processes disclosed herein can be automated/autonomous via software configured with algorithms to perform operations as described herein. The aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a magnetic tape; a read-only memory chip (ROM); and other forms of the kind well-known in binary form that is executable more-or-less directly by the computer; in "source code" that requires compilation or interpretation before execution; or in some intermediate form such as partially compiled code. The precise forms of the program storage device and of the encoding of instructions are immaterial here. It will also be understood by those of ordinary skill in the art that the disclosed structures can be implemented using any suitable materials for the components (e.g., metals, alloys, composites, etc.) and conventional hardware and components (e.g., conventional fasteners, motors, etc.) can be used to construct the systems and apparatus.

While the present disclosure describes specific aspects of the invention, numerous modifications and variations will become apparent to those skilled in the art after studying the disclosure, including use of equivalent functional and/or structural substitutes for elements described herein. For example, it will be appreciated that embodiments of the invention may be transported or conveyed to a desired site via any means known in the art (e.g., towed behind a barge at sea). Also, the steps as depicted may be performed in various orders to achieve the delivery, transfer, storage, installation, and/or movement of one or more items. By way of example, movements of the hoisting platform 24 and/or lift boat 270 may be implemented in various sequences to achieve to the desired position. Aspects of the invention can also be implemented to perform the described functions both on land and offshore. For example, systems for land operations may be implemented with conventional wheeled platforms. All such similar variations apparent to those skilled in the art are deemed to be within the scope of the invention.

This description is intended for purposes of illustration only and should not be construed in a limiting sense. The scope of this invention should be determined only by the language of the claims that follow. The term "comprising"

within the claims is intended to mean "including at least" such that the recited listing of elements in a claim are an open group. "A," "an" and other singular terms are intended to include the plural forms thereof unless specifically excluded.

What is claimed is:

1. A conveyance system for delivering at least one component of a windmill to a location, comprising:
   a transporter positionable adjacent a base at the location, the transporter carrying the at least one component of the windmill to the base; and
   a transfer system carried by the transporter, the transfer system comprising:
      a plurality of rails positionable on the base and the transporter;
      a support having a first portion of the plurality of rails of the transporter thereon, the support positionable along a second portion of the plurality of rails on a surface of the transporter, the support slidably movable between a retracted and an extended position whereby the support is selectively positionable adjacent the base; and
      at least one slider carrying the at least one component of the windmill, the at least one slider slidably movable along the plurality of rails of the transporter and the base whereby the at least one component is slidably transferrable between the transporter and the base.

2. The system of claim 1 wherein the transporter has a plurality of transporter legs extendable therefrom for selectively lifting the transporter to a desired height.

3. The system of claim 1, wherein the transporter comprises a boat.

4. The system of claim 3, wherein the transporter further comprises at least one boat dock for securing the transporter to the base.

5. The system of claim 4, wherein the at least one boat dock comprises a plurality of docking arms operatively connectable to corresponding grips on the base whereby the transporter is secured in an aligned position adjacent the base.

6. The system of claim 1, further comprising at least one access way.

7. The system of claim 1, further comprising a driver for driving the transporter to the location.

8. The system of claim 1, further comprising at least one winch operatively connectable to one of the transporter, the base and combinations thereof for moving the at least one component of the windmill.

9. The system of claim 1, wherein the support has a plurality of support legs extending therefrom for supporting the first portion of the plurality of rails of the transporter a distance above the surface of the transporter.

10. The system of claim 1, wherein the at least one component comprises a nacelle, and wherein the at least one slider is slidably movable along the first portion of the plurality of rails on the support and the plurality of rails of the base fur passing the nacelle therebetween.

11. The system of claim 10, wherein the first portion of the plurality of rails of the base is positioned on a carrier of the base whereby the nacelle is slidably movable onto the carrier.

12. The system of claim 1, wherein the at least one slider is slidably movable along a third portion of the plurality of rails on the surface of the transporter and the plurality of rails of the base for passing the at least one component therebetween.

13. The system of claim 12, wherein the second portion of the plurality of rails of the base are positioned on a surface of the base whereby the at least one component is slidably movable onto the surface of the base.

14. The system of claim 1, wherein the at least one component is supportable on the slider by a handler.

15. The system of claim 1, wherein the at least one component comprises at least one of at least one nacelle, at least one tower unit, at least one blade and combinations thereof.

16. A conveyance system for delivering at least one component of a windmill to a location, comprising:
   a transporter positionable adjacent a base at the location, the transporter carrying the at least one component of the windmill to the base, the transporter having a plurality of transporter legs extendable therefrom for selectively lifting the transporter to a desired height; and
   a transfer system carried by the transporter, comprising:
      a plurality of rails positionable on the base and the transporter;
      a support having a first portion of the plurality of rails of the transporter thereon, the support positionable along a second portion of the plurality of rails on a surface of the transporter, the support slidably movable between a retracted and an extended position whereby the support is selectively positionable adjacent the base; and
      at least one slider carrying the at least one component of the windmill, the at least one slider movable along the plurality of rails of the transporter and the base whereby the at least one component is slidably transferrable between the transporter and the base.

17. The system of claim 16, wherein the transporter comprises a boat.

18. The system of claim 17, wherein the transporter further comprises at least one boat dock for securing the transporter to the base.

19. The system of claim 18, wherein the at least one boat dock comprises a plurality of docking arms operatively connectable to corresponding grips on the base whereby the transporter is secured in an aligned position adjacent the base.

20. The system of claim 16, further comprising at least one access way.

21. The system of claim 16, further comprising a driver for driving the transporter to the location.

22. The system of claim 16, further comprising at least one winch operatively connectable to one of the transporter, the base and combinations thereof for moving the at least one component of the windmill.

23. The system of claim 16, wherein the at least one component comprises at least one of at least one nacelle, at least one tower unit, at least one blade and combinations thereof.

24. The system of claim 16, wherein the support has a plurality of support legs for supporting the first portion of the plurality of rails of the transporter a distance above the surface of the transporter.

25. The system of claim 16, wherein the at least one component comprises a nacelle, and wherein the at least one slider is slidably movable between the plurality of rails of the support and the base for passing the nacelle therebetween.

26. The system of claim 25, wherein the first portion of the plurality of rails of the base are positioned on a carrier of the base whereby the nacelle is slidably movable onto the carrier.

27. The system of claim 26, wherein the at least one slider is slidably movable along the second portion of the plurality of rails on the surface of the transporter and the plurality of rails of the base for passing the at least one component therebetween.

28. The system of claim 27, wherein the second portion of the plurality of rails of the base are positioned on a surface of the base whereby the at least one component is slidably movable onto the surface of the base.

29. The system of claim 27, wherein the at least one component further comprises one of a tower, a blade and combinations thereof.

30. The system of claim 27, wherein the at least one component is supportable on the at least one slider by a handler.

31. A conveyance system for delivering at least one component of a windmill to a location, comprising:
- a transporter for transporting the at least one component of the windmill to a base at the location, the transporter having a plurality of transporter legs extendable therefrom for selectively lifting the transporter to a desired height; and
- a transfer system comprising at least one slider for carrying the at least one component of the windmill, the at least one slider movable between the transporter and the base via a plurality of rails whereby the at least one component of the windmill is transferred to the base;
- wherein the plurality of rails is positionable on the base and the transporter;
- wherein the transfer system further comprises a support having a first portion of the plurality of rails of the transporter thereon, the support positionable along a second portion of the plurality of rails on a surface of the transporter, the support slidably movable between a retracted and an extended position whereby the support is positionable adjacent the base;
- wherein the at least one component comprises a nacelle, and wherein the at least one slider is slidably movable between the plurality of rails of the support and the base for passing the nacelle therebetween; and
- wherein the first portion of the plurality of rails of the base are positioned on a carrier of the base whereby the nacelle is slidably movable onto the carrier.

* * * * *